(12) United States Patent
Jeong et al.

(10) Patent No.: US 12,386,154 B2
(45) Date of Patent: Aug. 12, 2025

(54) IMAGING LENS SYSTEM

(71) Applicant: SAMSUNG ELECTRO-MECHANICS CO., LTD., Suwon-si (KR)

(72) Inventors: You Jin Jeong, Suwon-si (KR); So Mi Yang, Suwon-si (KR); Jae Hyuk Huh, Suwon-si (KR); Byung Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/362,008

(22) Filed: Jul. 31, 2023

(65) Prior Publication Data
US 2024/0168265 A1     May 23, 2024

(30) Foreign Application Priority Data

| | | |
|---|---|---|
| Nov. 21, 2022 | (KR) | 10-2022-0156668 |
| Nov. 21, 2022 | (KR) | 10-2022-0156741 |
| Mar. 27, 2023 | (KR) | 10-2023-0039586 |

(51) Int. Cl.
| | |
|---|---|
| *G02B 13/00* | (2006.01) |
| *G02B 5/04* | (2006.01) |
| *G02B 9/34* | (2006.01) |

(52) U.S. Cl.
CPC .......... *G02B 13/0065* (2013.01); *G02B 5/04* (2013.01); *G02B 9/34* (2013.01); *G02B 13/0035* (2013.01); *G02B 13/004* (2013.01)

(58) Field of Classification Search
CPC .............. G02B 13/0065; G02B 13/007; G02B 13/0035; G02B 13/004; G02B 9/12; G02B 9/14; G02B 9/16; G02B 9/34; G02B 9/36; G02B 9/58
See application file for complete search history.

(56) References Cited

U.S. PATENT DOCUMENTS

| | | | |
|---|---|---|---|
| 7,605,988 | B2 | 10/2009 | Sohn et al. |
| 10,989,899 | B2 | 4/2021 | Liao et al. |
| 2018/0059376 | A1* | 3/2018 | Lin ................ G02B 13/0045 |
| 2018/0196228 | A1 | 7/2018 | Bone et al. |

(Continued)

FOREIGN PATENT DOCUMENTS

| | | |
|---|---|---|
| CN | 211905839 U | 11/2020 |
| CN | 113296234 A | 8/2021 |

(Continued)

OTHER PUBLICATIONS

Machine translation of CN 113341539 A retrieved electronically from PE2E Search Feb. 7, 2024 (Year: 2024).*

(Continued)

*Primary Examiner* — Cara E Rakowski
(74) *Attorney, Agent, or Firm* — NSIP Law

(57) ABSTRACT

An imaging lens system is provided. The imaging lens system includes a lens group including a plurality of lenses; and an optical path folding member disposed between the lens group and an imaging plane. The lens group may include three or more lenses sequentially arranged from an object side. The optical path folding member may include a first prism and a second prism. At least one of the first prism and the second prism may include a visor that prevents a flare.

9 Claims, 18 Drawing Sheets

(56) References Cited

U.S. PATENT DOCUMENTS

| | | | |
|---|---|---|---|
| 2019/0094500 | A1 | 3/2019 | Tseng et al. |
| 2019/0377158 | A1* | 12/2019 | Liao .................. G02B 9/60 |
| 2021/0063617 | A1 | 3/2021 | Yang et al. |
| 2021/0199936 | A1 | 7/2021 | Dai et al. |
| 2021/0349287 | A1* | 11/2021 | Yeh ............... G02B 13/0035 |
| 2022/0057602 | A1 | 2/2022 | Mercado |
| 2022/0091373 | A1* | 3/2022 | Saiga ............. G02B 13/0035 |
| 2022/0163706 | A1 | 5/2022 | Feldman et al. |
| 2022/0187578 | A1 | 6/2022 | Yeh et al. |
| 2022/0196993 | A1* | 6/2022 | Liao .................. G02B 5/22 |
| 2022/0214527 | A1* | 7/2022 | Hua ............... G02B 13/0035 |
| 2022/0244495 | A1 | 8/2022 | Yeh et al. |
| 2022/0294945 | A1* | 9/2022 | Zhao .................. G03B 17/17 |
| 2023/0116701 | A1* | 4/2023 | Huh ................... G02B 13/02 |
| | | | 348/340 |
| 2024/0126045 | A1* | 4/2024 | Yeh ............... G02B 13/0065 |
| 2024/0176104 | A1* | 5/2024 | Huh ................... G02B 9/34 |

FOREIGN PATENT DOCUMENTS

| | | | | |
|---|---|---|---|---|
| CN | 214097847 | U | | 8/2021 |
| CN | 113341539 | A | * | 9/2021 |
| CN | 112532816 | B | | 5/2022 |
| CN | 114815164 | A | | 7/2022 |
| CN | 114966919 | A | | 8/2022 |
| CN | 113740993 | B | | 11/2022 |
| CN | 115327743 | A | | 11/2022 |
| CN | 115437118 | A | * | 12/2022 ......... G02B 13/0065 |
| JP | H 11-95128 | A | | 4/1999 |
| JP | 2005-221896 | A | | 8/2005 |
| JP | 2007-183444 | A | | 7/2007 |
| KR | 10-2019-0022522 | A | | 3/2019 |
| KR | 10-2021-0043670 | A | | 4/2021 |
| KR | 10-2021-0127868 | A | | 10/2021 |
| KR | 10-2022-0132961 | A | | 10/2022 |
| TW | 1624708 | B | | 5/2018 |
| TW | 1725315 | B | | 4/2021 |
| WO | WO 2019/008517 | A1 | | 1/2019 |
| WO | WO 2020/068594 | A1 | | 4/2020 |
| WO | WO 2022/160120 | A1 | | 8/2022 |

OTHER PUBLICATIONS

Machine translation of CN 115437118 A retrieved electronically from PE2E Search Feb. 7, 2024 (Year: 2024).*
Gross et al. "Handbook of Optical Systems Volume 3: Aberration Theory and Correction of Optical Systems" Weinheim Germany, WILEY-VCH Verlag Gmbh & Co. KGaA, pp. 377-379 (Year: 2007).*
Korean Office Action issued on Oct. 26, 2023, in counterpart Korean Patent Application No. 10-2023-0039586 (7 pages in English, 5 pages in Korean).
Taiwanese Office Action issued on Feb. 26, 2024, in counterpart Taiwanese Patent Application No. 112130144 (10 pages in English, 11 pages in Chinese).
Korean Office Action issued on Feb. 27, 2024, in counterpart Korean Patent Application No. 10-2023-0039586 (4 pages in English, 4 pages in Korean).
Korean Office Action issued on Aug. 28, 2024, in counterpart Korean Patent Application No. 10-2023-0039586 (4 pages in English, 4 pages in Korean).
Taiwan Office Action issued on Jun. 3, 2025, in corresponding Taiwanese Patent Application No. 113145142. (6pages in English, 6pages in Taiwanese).

* cited by examiner

IMAGING LENS SYSTEM

CROSS-REFERENCE TO RELATED APPLICATIONS

This application claims priority under 35 USC § 119(a) to Korean Patent Application Nos. 10-2022-0156668 filed on Nov. 21, 2022, 10-2022-0156741 filed on Nov. 21, 2022, and 10-2023-0039586 filed on Mar. 27, 2023, in the Korean Intellectual Property Office, the entire disclosures of which are incorporated herein by reference for all purposes.

BACKGROUND

1. Field

The following description relates to an imaging lens system including an optical path folding member.

2. Description of Related Art

It may be difficult for an imaging lens system (for example, a telephoto imaging lens system) which has a long focal length to have a small thickness and a miniature size, and it may thus be difficult for the system to be mounted in a small terminal. An imaging lens system (or a folded imaging lens system) including an optical path folding member may be used to solve this problem. The folded lens imaging lens system may use a prism to reduce an external size of an optical path, and may thus be mounted in a small terminal having a small space. However, in the imaging lens system including the optical path folding member, unintended light may be incident to an imaging plane by the optical path folding member, thus impairing a resolution of the imaging lens system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an imaging lens system includes a lens group including a first lens, a second lens, and a third lens sequentially disposed from an object side toward an imaging plane; and an optical path folding member disposed between the lens group and the imaging plane, wherein $0.70<BFL/f<1.20$, where BFL is a distance from an image-side surface of a rearmost lens disposed closest to the imaging plane in the lens group to the imaging plane, and f is a focal length of the imaging lens system.

A portion of the optical path folding member, other than an incident light entrance area and an emitted light exit area of the optical path folding member, may be covered by a light-shielding member.

The optical path folding member may have a structure that adjusts an amount of received light.

The structure may be at least one of a groove and an inclined surface.

The optical path folding member may include an inclined surface that is parallel to reflected light inside the optical path folding member.

The optical path folding member may have two or more reflective surfaces.

The first lens has positive refractive power.

The lens group further may include a fourth lens disposed on an image side of the third lens.

The rearmost lens may have negative refractive power.

In a general aspect, an imaging lens system includes a lens group including a first lens, a second lens, and a third lens sequentially disposed from an object side toward an imaging plane; and a plurality of optical path folding members disposed between the lens group and the imaging plane, wherein $1.05<TTL/f$, where TTL is a distance from an object-side surface of the first lens to the imaging plane, and f is a focal length of the imaging lens system.

$0.10<ImgHT/BFL<0.13$, where ImgHT is a height of the imaging plane and BFL is a distance from an image-side surface of a rearmost lens disposed closest to the imaging plane in the lens group to the imaging plane.

$0.6<fF/BFL<1.30$, where fF is a focal length of the first lens and BFL is a distance from an image-side surface of a rearmost lens disposed closest to the imaging plane in the lens group to the imaging plane.

$-1.0<fR/BFL<-0.40$, where fR is a focal length of a rearmost lens disposed closest to the imaging plane in the lens group, and BFL is a distance from an image-side surface of the rearmost lens to the imaging plane.

$0.06<|(fF+fR)/BFL|<0.40$, where fF is a focal length of the first lens, fR is a focal length of a rearmost lens disposed closest to the imaging plane in the lens group, and BFL is a distance from an image-side surface of the rearmost lens to the imaging plane.

$0.30<LFS1/BFL<0.50$, where LFS1 is a radius of curvature of the object-side surface of the first lens, and BFL is a distance from an image-side surface of a rearmost lens disposed closest to the imaging plane in the lens group to the imaging plane.

$0.42<(LFS1+LRS2)/BFL<0.74$, where LFS1 is a radius of curvature of the object-side surface of the first lens, LRS2 is a radius of curvature of an image-side surface of a rearmost lens disposed closest to the imaging plane in the lens group, and BFL is a distance from an image-side surface of the rearmost lens to the imaging plane.

In a general aspect, an imaging lens system includes a lens group including a first lens, a second lens, and a third lens sequentially disposed from an object side toward an imaging plane; and a plurality of optical path folding members disposed between the lens group and the imaging plane, wherein each of the plurality of optical path folding members is configured to have a plurality of reflective surfaces, and wherein neighboring optical path folding members of the plurality of optical path folding members has different Abbe numbers of different refractive indices.

Other features and aspects will be apparent from the following detailed description, the drawings, and the claims.

Figure 1:
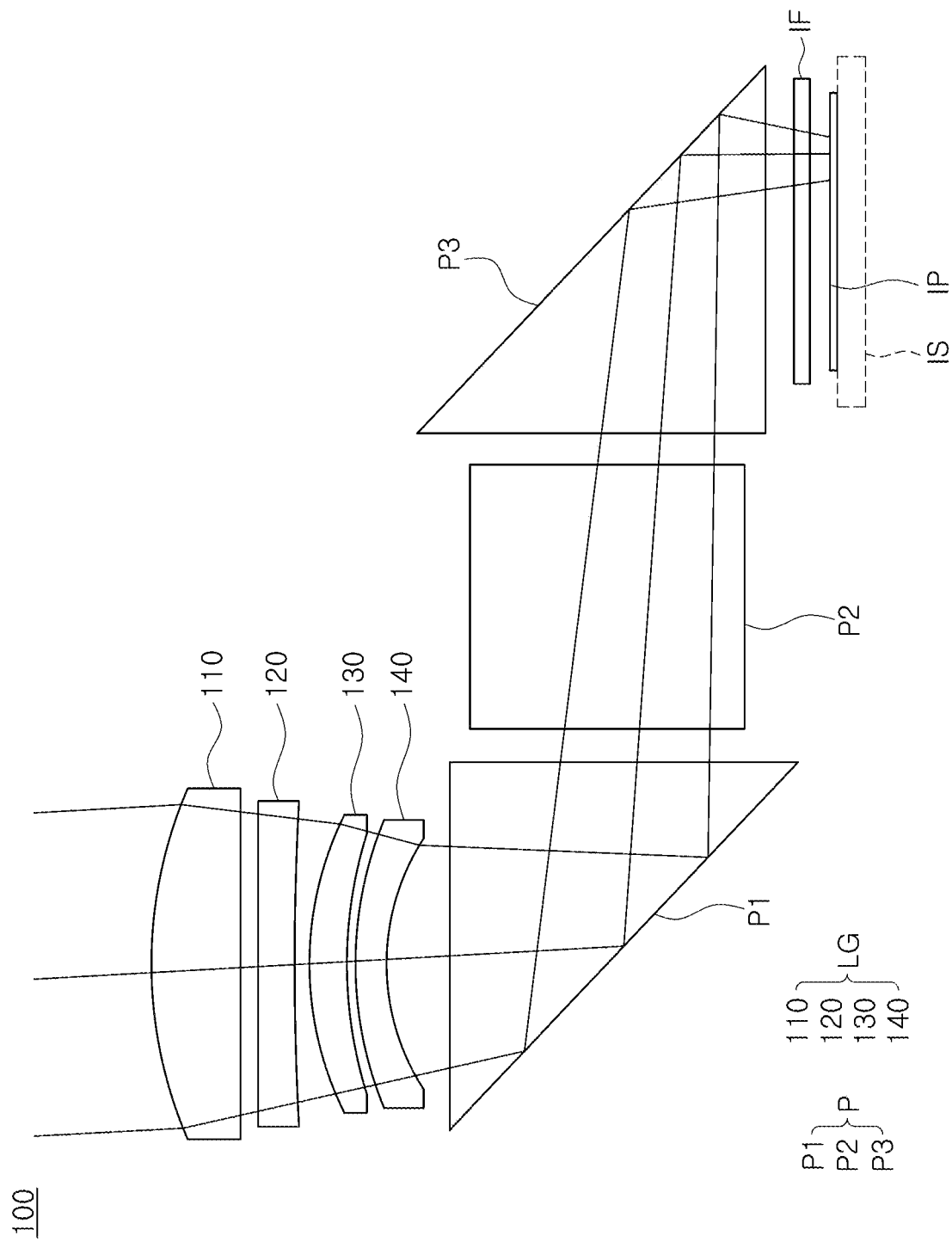
FIG. 1 illustrates a configuration diagram of an example imaging lens system, in accordance with one a first embodiment.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

One or more examples may provide an imaging lens system that utilizes an optical path folding member.

In the one or more examples, a first lens may indicate a lens closest to an object (or a subject). Additionally, the number of lenses may indicate an order in which the lenses are disposed from an object side to an imaging plane in an optical axis direction. For example, a second lens may indicate a lens disposed second from the object side, and the third lens may indicate a lens disposed third from the object side. In the one or more examples, a radius of curvature of a lens, a thickness, a distance TTL from an object-side surface of the first lens to an imaging plane, a height ImgHT of the imaging plane, and a focal length are represented by millimeters (mm).

Each of the thickness of the lens, a distance between the lenses, the TTL and an incidence angle may be a dimension calculated based on an optical axis of the imaging lens system. Further, in a description for a shape of the lens, a convex surface of the lens may indicate that a paraxial region of a corresponding surface is convex, and a concave surface of the lens may indicate that the paraxial region of a corresponding surface is concave. Therefore, although it is described that a surface of the lens is convex, an edge portion of the lens may be concave. Likewise, although it is described that a surface of the lens is concave, the edge portion of the lens may be convex.

The imaging lens system described herein may be mounted in a portable electronic device. In an example, the imaging lens system may be mounted in a smartphone (or a portable terminal), a laptop computer, an augmented reality device, a virtual reality (VR) device, a portable game machine, or the like, as only examples. However, the usage range and usage example of the imaging lens system described herein may not be limited to the electronic device described above. For example, the imaging lens system may be applied to an electronic device which may need high-resolution imaging while providing a narrow mounting space.

The example imaging lens system described herein may reduce an external size of the imaging lens system while securing a long rear focal length BFL (or a distance from an image-side surface of the rearmost lens to the imaging plane). In an example, the example imaging lens system described herein may reduce the external size of the imaging lens system while securing the BFL needed to implement a telephoto imaging lens system by using a reflecting member. In another example, the imaging lens system described herein may provide an imaging plane having a considerable size for implementation of high resolution. In yet another example, the imaging lens system described herein may have an integrated form to be mounted in the portable terminal while securing the long focal length or the long BFL.

In the one or more examples, an optical path folding member may refer to any member which may allow light to be reflected. For example, the optical path folding member may collectively refer to all of a reflector, a prism, and the like, as only examples. Therefore, in the one or more examples, the reflector, the prism, and the optical path folding member may all refer to the same component or interchangeable components.

An example imaging lens system according to a first aspect may include: a lens group including a plurality of lenses; and an optical path folding member disposed between the lens group and an imaging plane. In the imaging lens system according to a first aspect, the lens group may include three or more lenses sequentially arranged from the object side to the imaging plane. In an example, the lens group may include a first lens, a second lens, and a third lens sequentially arranged from the object side to the imaging plane. In another example, the lens group may include a first lens, a second lens, a third lens, and a fourth lens sequentially arranged from the object side to the imaging plane. In the imaging lens system according to a first aspect, the optical path folding member may include a plurality of members. For example, the optical path folding member may include two prisms. In another example, the optical path folding member may include three prisms. The imaging lens system according to a first aspect may satisfy a unique conditional expression. In an example, the imaging lens system may satisfy the following conditional expression: $0.7<BFL/TTL<1.20$. For reference, in the conditional expression, TTL is a distance from an object-side surface of the frontmost lens (or the first lens) in the lens group to the imaging plane, and BFL is a distance from the image-side surface of the rearmost lens in the lens group to the imaging plane.

In the imaging lens system according to a first aspect, the optical path folding member may include a plurality of reflective surfaces, if necessary.

An imaging lens system according to a second aspect may include: a lens group including a plurality of lenses; and an optical path folding member disposed between the lens group and an imaging plane. In the imaging lens system according to a second aspect, the lens group may include three or more lenses sequentially arranged from the object side to the imaging plane. In an example, the lens group may include a first lens, a second lens, and a third lens sequentially arranged from the object side to the imaging plane. In another example, the lens group may include a first lens, a second lens, a third lens, and a fourth lens sequentially arranged from the object side to the imaging plane. In the imaging lens system according to a second aspect, the optical path folding member may include a plurality of members. In an example, the optical path folding member may include two prisms. In another example, the optical path folding member may include three prisms. The imaging lens system according to a second aspect may satisfy a unique conditional expression. For example, the imaging lens system may satisfy the following conditional expression: $1.05<TTL/f$. For reference, in the conditional expression, f is a focal length of the imaging lens system.

An imaging lens system according to a third aspect may include: a lens group including a plurality of lenses; and an optical path folding member disposed between the lens group and an imaging plane. In the imaging lens system according to a third aspect, the lens group may include three or more lenses sequentially arranged from the object side to the imaging plane. In an example, the lens group may include a first lens, a second lens, and a third lens sequentially arranged from the object side to the imaging plane. In another example, the lens group may include a first lens, a second lens, a third lens, and a fourth lens sequentially arranged from the object side to the imaging plane. In the imaging lens system according to a third aspect, the optical path folding member may include a plurality of members. In an example, the optical path folding member may include two prisms. In another example, the optical path folding member may include three prisms. In the imaging lens system according to a third aspect, the optical path folding member may include a member that adjusts an amount of incident light or an amount of emitted light. In an example, a visor may be disposed on at least one of the incident surface or exit surface of the first prism. The visor may have various shapes to adjust the amount of incident light or emitted light. In an example, an aperture of the visor may have a circular, elliptical, or polygonal shape, or a combination thereof.

The imaging lens system according to a fourth aspect may satisfy one or more of the following conditional expressions. However, only the imaging lens system according to a fourth aspect may not satisfy the following conditional expressions. In an example, the imaging lens systems according to a first aspect to a third aspect described above may satisfy one or more of the following conditional expressions:

$0.70<BFL/TTL$ $10\ mm<f$ $1.05<TTL/f$ $1.60 \leq Nmax \leq 1.70$ $0.70<BFL/f<1.20$.

In the conditional expression, BFL is a distance from the image-side surface of the rearmost lens in the lens group to the imaging plane, and Nmax is the maximum refractive index of a lens included in the lens group.

The imaging lens system may satisfy a more limited form as follows for some of the above-mentioned conditional expressions:

$0.70<BFL/TTL<0.90$ $15.0\ mm<f<23.0\ mm$ $1.16<TTL/f<1.36$.

The imaging lens system according to a fifth aspect may satisfy one or more of the following conditional expressions. However, only the imaging lens system according to a fifth aspect may not satisfy the following conditional expressions. In an example, the imaging lens systems according to a first aspect to a fourth aspect described above may satisfy one or more of the following conditional expressions:

$0.10<ImgHT/BFL<0.13$ $0.60<fF/BFL<1.30$ $-1.0<fR/BFL<-0.40$ $0.06<|(fF+fR)/BFL|<0.40$ $0.30<LFS1/BFL<0.50$ $0.42<(LFS1+LRS2)/BFL<0.74$ $-1.0<fR/f<-0.50$.

In the conditional expression, ImgHT is the height of the imaging plane, fF is a focal length of the frontmost lens disposed closest to the object in the lens group, fR is a focal length of the rearmost lens disposed closest to the imaging plane in the lens group, LFS1 is a radius of curvature of an object-side surface of the frontmost lens, and LRS2 is a radius of curvature of an image-side surface of the rearmost lens.

The lens groups according to a first aspect to a fifth aspect may have the following characteristics. In an example, the frontmost lens in the lens group may have positive refractive power. In another example, the rearmost lens in the lens group may have negative refractive power.

The imaging lens systems according to a first aspect to a fifth aspect may include one or more lenses having the following characteristics, if necessary. In an example, the imaging lens system according to a first aspect may include one of the first to fourth lenses having the following characteristics. In another example, the imaging lens system according to a second aspect may include two or more of the first to fourth lenses having the following characteristics. However, the imaging lens system according to the above-described aspect may not necessarily include the lens having the following characteristics.

The first lens may have refractive power. In an example, the first lens may have positive refractive power. The first lens may have a convex surface. For example, the first lens may have a convex object-side surface. The first lens may have a predetermined refractive index. For example, the refractive index of the first lens may be 1.5 or more. As a specific example, the refractive index of the first lens may be greater than 1.5 and less than 1.6. The first lens may have a predetermined Abbe number. For example, the Abbe number of the first lens may be 50 or more. As a specific example, the Abbe number of the first lens may be greater than 50 and less than 90. The first lens may have a predetermined focal length. For example, the focal length of the first lens may be determined in a range of 10.0 mm to 22.0 mm.

The second lens may have refractive power. For example, the second lens may have a positive or negative refractive power. The second lens may have a convex surface. For example, the second lens may have a convex object-side surface. The second lens may have a predetermined refractive index. In an example, the refractive index of the second lens may be greater than the refractive index of the first lens. The second lens may have a predetermined Abbe number. In an example, the Abbe number of the second lens may be 20 or more.

The third lens may have refractive power. For example, the third lens may have a positive or negative refractive power. The third lens may have a convex surface. In an example, the third lens may have a convex object-side surface. The third lens may have a predetermined refractive index. For example, the refractive index of the third lens may be 1.5 or more. As a specific example, the refractive index of the third lens may be greater than 1.5 and less than 1.7.

The fourth lens may have refractive power. For example, the fourth lens may have negative refractive power. The fourth lens may have a convex surface. For example, the fourth lens may have a convex object-side surface. The fourth lens may have a predetermined refractive index. For example, the refractive index of the fourth lens may be 1.6 or more. As a specific example, the refractive index of the fourth lens may be greater than 1.6 and less than 1.7. The fourth lens may have a predetermined Abbe number. For example, the Abbe number of the fourth lens may be 30 or less. As a specific example, the Abbe number of the fourth lens may be greater than 20 and less than 30. The fourth lens may have a predetermined focal length. For example, the focal length of the first lens may be determined in a range of −20.0 mm to −8.0 mm.

Aspherical surfaces of the first to fourth lenses may be expressed by Equation 1 below. In Equation 1, c is an inverse of a radius of curvature of the corresponding lens, k is a conic constant, r is a distance from an arbitrary point on an aspherical surface of the lens to the optical axis, A to H and J indicate aspherical constants, and Z (or SAG) is a height in the optical axis direction from the arbitrary point on the aspheric surface to an apex of the aspheric surface.

$$z = \frac{cr^2}{1 + \sqrt{1 - (1+k)c^2r^2}} + AR^4 + BR^6 + Cr^8 + Dr^{10} + Er^{12} + Fr^{14} + Gr^{16} + Hr^{18} + Jr^{20}$$

The optical path folding member according to the one or more examples may have a structure that adjusts an amount of light. In an example, the incident surface and exit surface of the optical path folding member may have a light-shielding member that shields light of a portion other than the entrance and the exit may be disposed on the incident surface and exit surface of the optical path folding member. The entrance and exit may be a light entrance and a light entry surface. As a specific example, an aperture may be disposed on the incident surface and exit surface of the optical path folding member. In another example, a groove may be disposed in a partial region of the optical path folding member. In yet another example, an inclined surface having an inclination substantially parallel to reflected light of the optical path folding member may be disposed in the partial region of the optical path folding member.

An example electronic device according to a first aspect may have a thin form factor in order to be easily carried or stored. In an example, the electronic device according to an aspect may be, as only examples, a smartphone, a laptop computer, or the like. The electronic device according to an aspect may include a camera module having a long focal length to implement high resolution. For example, the electronic device may be equipped with a camera module including one of the imaging lens systems according to a first aspect to a fourth aspect described above. However, the imaging lens system included in the camera module may not be limited to the imaging lens systems according to a first aspect to a fourth aspect described above.

Hereinafter, one or more examples will be described in detail with reference to the accompanying drawings.

First, the description describes an imaging lens system in accordance with a first embodiment with reference to FIG. 1.

An example imaging lens system 100 in accordance with a first embodiment may include a lens group LG and an optical path folding member P. However, components of the imaging lens system 100 are not limited to the above-mentioned members. For example, the imaging lens system 100 may further include a filter IF and an imaging plane IP. The lens group LG and the optical path folding member P may be sequentially disposed from the object side to the imaging plane. In an example, the lens group LG may be disposed on an object side of the optical path folding member P, and the optical path folding member P may be disposed between the lens group LG and the imaging plane IP.

Next, the above-mentioned components are described in order.

The lens group LG may include a plurality of lenses. In an example, the lens group LG may include a first lens 110, a second lens 120, a third lens 130, and a fourth lens 140 sequentially arranged from the object side to the imaging plane. The first lens 110 to the fourth lens 140 may be arranged at a predetermined interval. For example, an image-side surface of the first lens 110 may not be in contact with an object-side surface of the second lens 120, and an image-side surface of the second lens 120 may not be in contact with an object-side surface of the third lens 130. However, the first lens 110 to the fourth lens 140 may not necessarily be arranged to be spatially separate from each other. For example, the image-side surface of the first lens 110 may be in contact with the object-side surface of the second lens 120, and the image-side surface of the second lens 120 may be in contact with the object-side surface of the third lens 130.

Next, the description describes characteristics of the first lens 110 to the fourth lens 140.

The first lens 110 may have positive refractive power, and may have a convex object-side surface and a concave image-side surface. The second lens 120 may have negative refractive power, and may have a convex object-side surface and a concave image-side surface. The third lens 130 may have positive refractive power, and may have a convex object-side surface and a concave image-side surface. The fourth lens 140 may have negative refractive power, and may have a convex object-side surface and a concave image-side surface.

Next, the description describes the optical path folding member P.

The optical path folding member P may include a plurality of prisms P1, P2, and P3. For example, the optical path folding member P may include the first prism P1, the second prism P2, and the third prism P3 sequentially arranged along the optical path. The optical path folding member P may have a plurality of reflective surfaces. For example, the optical path folding member P may have two reflective surfaces. As a specific example, one reflective surface may be disposed on each of the first prism P1 and the third prism P3.

Figure 2:
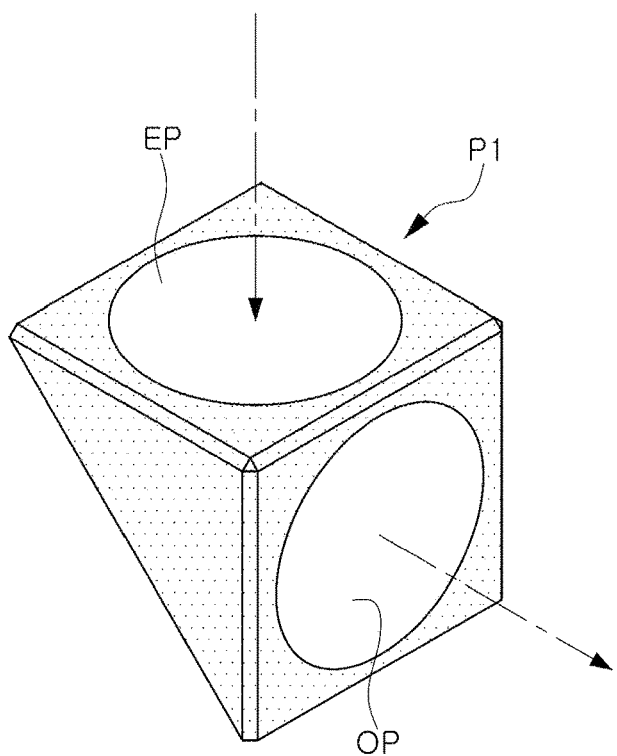
FIG. 2 illustrates a perspective view of a type of a first prism illustrated in FIG. 1.
Figure 3:
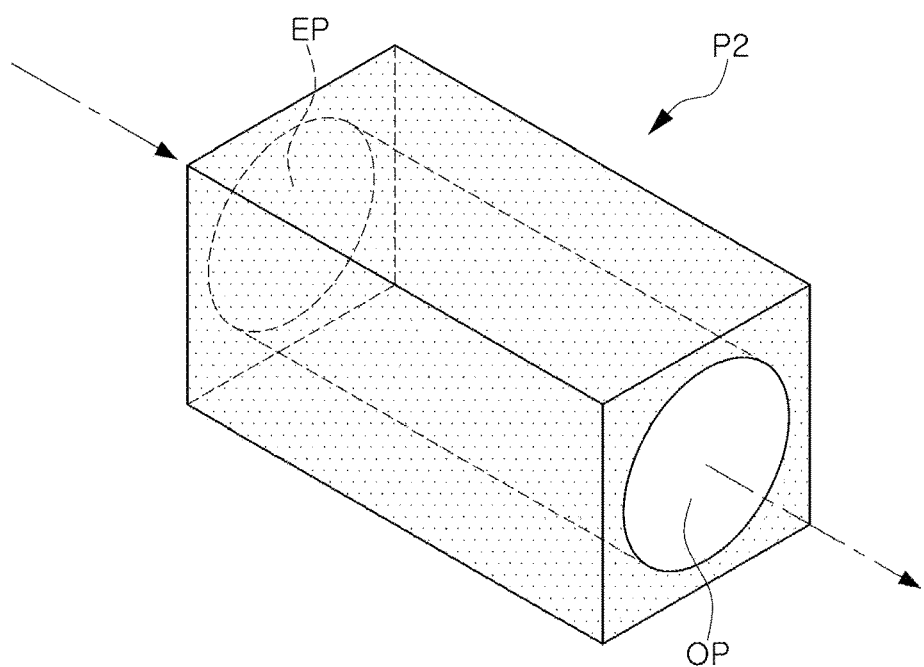
FIG. 3 illustrates a perspective view one of a type of a second prism illustrated in FIG. 1.
Figure 4:
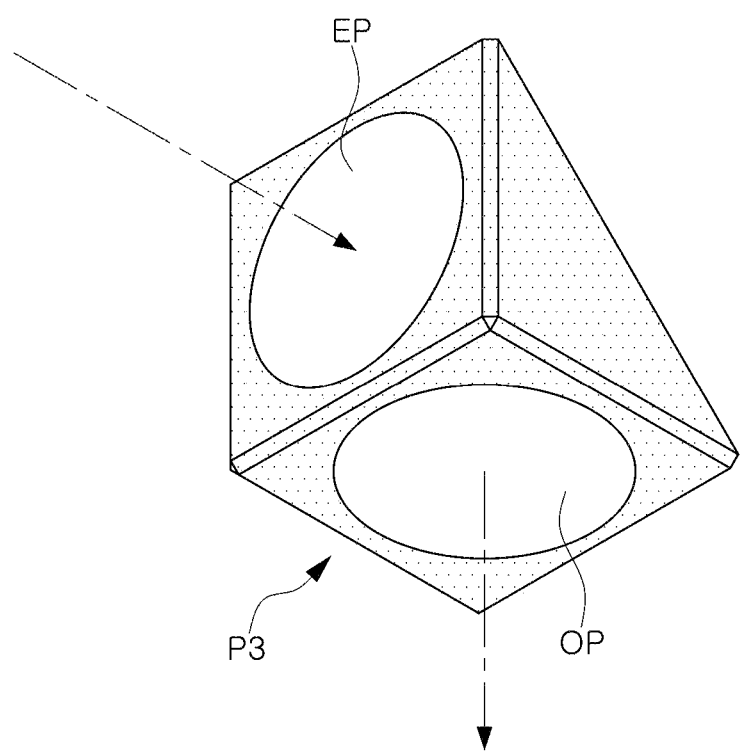
FIG. 4 illustrates a perspective view one of a type of a third prism illustrated in FIG. 1.

The optical path folding member P may adjust the amount of incident light and the amount of emitted light. In an example, as illustrated in FIGS. 2 through 4, a portion of each of the first prism P1, the second prism P2, and the third prism P3 other than the entrance EP and the exit OP may be covered by the light-shielding member (for example, a light-shielding film or light-shielding paint).

Figure 5A:
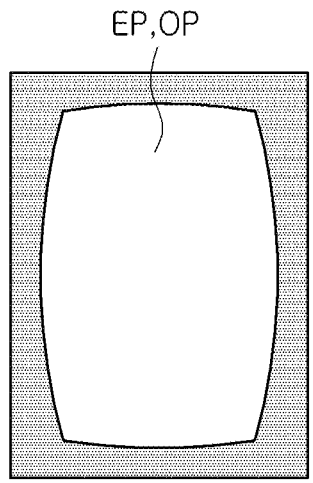
FIGS. 5A, 5B, 5C, 5D, and 5E illustrate other types of an entrance EP and an exit OP illustrated in FIGS. 2 through 4.
Figure 5B:
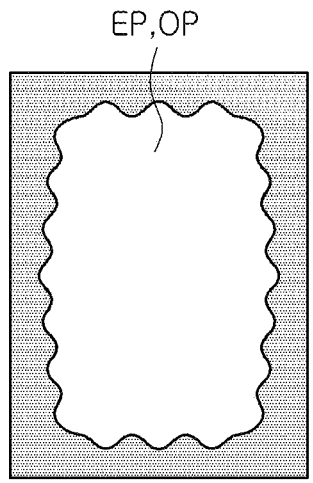
Figure 5C:
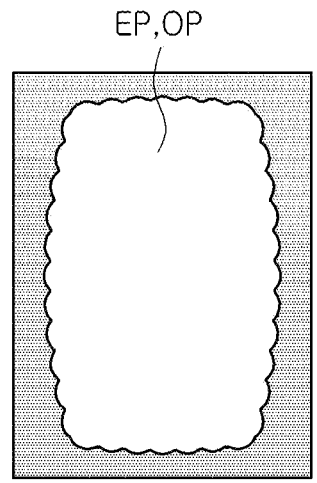
Figure 5D:
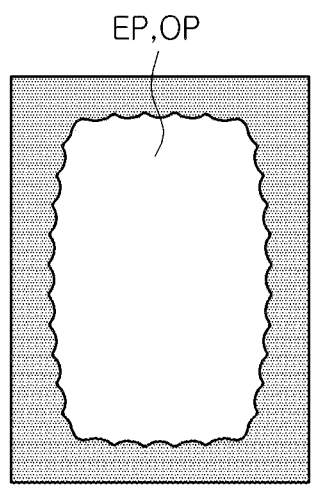
Figure 5E:
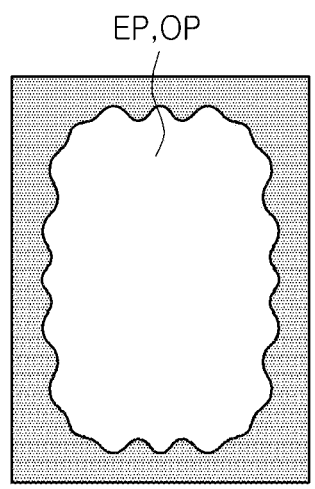

As illustrated in FIGS. 5A, 5B, 5C, 5D, and 5E, the entrance EP and the exit OP may have various shapes based on the light-shielding member. In an example, each of the entrance EP and the exit OP may be formed in a long direction as illustrated in FIG. 5A. In another example, each of the entrance EP and the exit OP may have an edge formed as a waveform as illustrated in FIGS. 5B through 5E. The entrance EP and exit OP formed in this way may be advantageous in mitigating a flare phenomenon.

The entrance EP and exit OP of the prisms P1, P2, or P3 may have different sizes. In an example, the entrance EP of the prism P1, P2, or P3 may be greater than the exit OP of the prisms P1, P2, or P3. The respective entrances EP or exits OP of the prisms P1, P2, and P3 may have different sizes. In an example, the entrance EP of the first prism P1 may be greater than the entrance EP of the second prism P2, and the entrance EP of the second prism P2 may be greater than the entrance EP of the third prism P3. In another example, the exit OP of the first prism P1 may be greater than the exit OP of the second prism P2, and the exit OP of the second prism P2 may be greater than the exit OP of the third prism P3. However, a size relationship between the entrances EP and exits OP of the prisms P1, P2, and P3 is not limited to the above-described form. In an example, the entrances EP of the first prism P1 to the third prism P3 may all have the same size. In another example, the exits OP of the first prism P1 to the third prism P3 may all have the same size.

A component that adjusts the amount of light may be further disposed between the first prism P1 to the third prism P3. In an example, the aperture may be disposed on at least one of a portion between the first prism P1 and the second prism P2 and a portion between the second prism P2 and the third prism P3.

Figure 6:
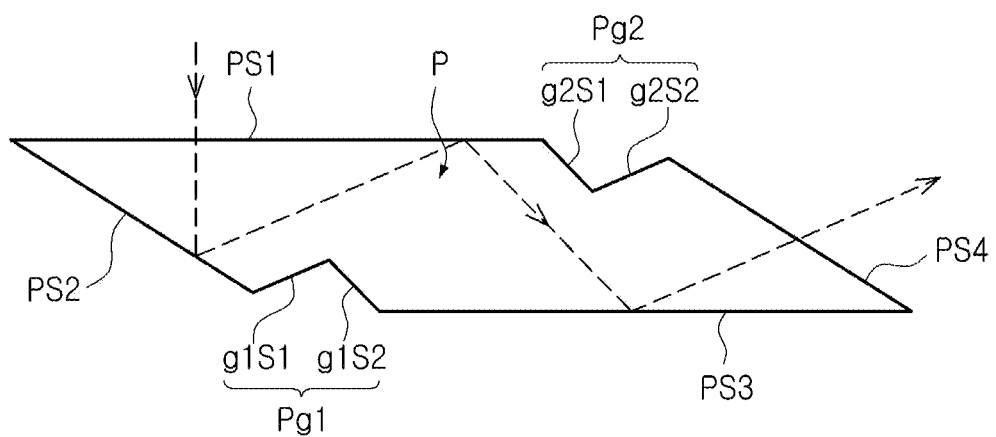
FIGS. 6, 7, and 8 are modifications of the optical path folding member illustrated in FIG. 1.
Figure 7:
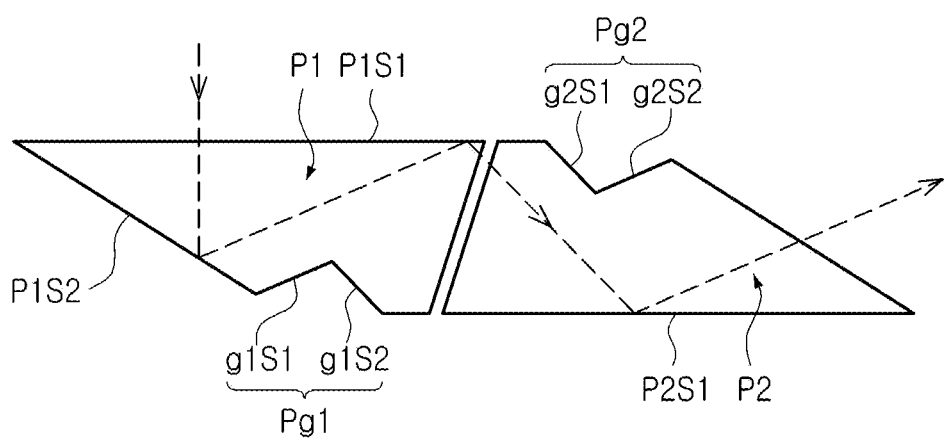
Figure 8:
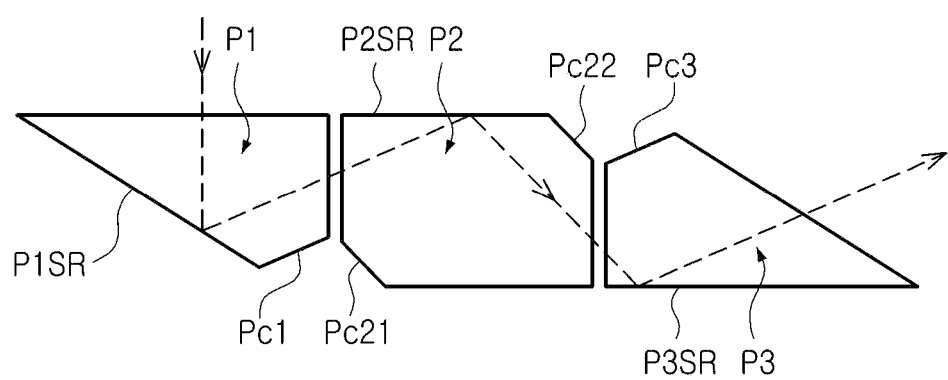

The optical path folding member, in accordance with one or more embodiments, may be modified into the forms illustrated in FIGS. 6 through 8.

First, a first modification of the optical path folding member will be described with reference to FIG. 6.

As illustrated in FIG. 6, the optical path folding member may include one prism P. The prism P may reduce the flare phenomenon. For example, a first groove Pg1 and a second groove Pg2 may be disposed in a partial region of the prism P. The first groove Pg1 may be disposed in a boundary region between the second surface PS2 and the third surface PS3, and the second groove Pg2 may be disposed in a boundary region between the first surface PS1 and the fourth surface PS4. The first groove Pg1 and the second groove Pg2 may be substantially parallel to reflected light inside the prism. In an example, a first inclined surface g1S1 of the first groove Pg1 may be parallel to light reflected from the second surface PS2, and a second inclined surface g1S2 of the first groove Pg1 may be parallel to light reflected from the first surface PS1. In another example, a first inclined surface g2S1 of the second groove Pg2 may be parallel to light reflected from the first surface PS1, and a second inclined surface g2S2 of the second groove Pg2 may be parallel to light reflected from the third surface PS3.

Next, a second modification of the optical path folding member will be described with reference to FIG. 7.

As illustrated in FIG. 7, the optical path folding member may include two prisms P1 and P2. The first prism P1 and the second prism P2 may be disposed at a predetermined interval. In an example, a distance from an exit surface of the first prism P1 to an incident surface of the second prism P2 may be 0.05 mm to 10 mm. In an example, the first prism P1 and the second prism P2 may have different optical characteristics. For example, the first prism P1 and the second prism P2 may have different refractive indices. In another example, the first prism P1 and the second prism P2 may have different Abbe numbers. The optical path folding member including the prisms P1 and P2 having the different optical characteristics as described above may be advantageous in improving the resolution and aberration of the imaging lens system.

The first prism P1 and the second prism P2 may mitigate the flare phenomenon. In an example, a first groove Pg1 and a second groove Pg2 may respectively be disposed in the first prism P1 and the second prism P2. The first groove Pg1 and the second groove Pg2 may be substantially parallel to reflected light inside the optical path folding member. For example, a first inclined surface g1S1 of the first groove Pg1 may be parallel to light reflected from a second surface P1S2 of the first prism P1, and a second inclined surface g1S2 of the first groove Pg1 may be parallel to light reflected from a first surface P1S1 of the first prism P1. In another example, a first inclined surface g2S1 of the second groove Pg2 may be parallel to light reflected from a first surface P1S1 of the first prism P1, and a second inclined surface g2S2 of the second groove Pg2 may be parallel to light reflected from a first surface P2S1 of the second prism P2.

Next, a third modification of the optical path folding member will be described with reference to FIG. 8.

As illustrated in FIG. 8, the optical path folding member may include three prisms P1, P2, and P3. The first prism P1 to the third prism P3 may be arranged at a predetermined interval. In an example, a distance from an exit surface of the first prism P1 to an incident surface of the second prism P2 may be 0.05 mm to 10 mm. In another example, a distance from an exit surface of the second prism P2 to an incident surface of the third prism P3 may be 0.05 mm to 10 mm.

The first prism P1 to the third prism P3 may have different optical characteristics. In an example, the first prism P1 to the third prism P3 may have different refractive indices. In another example, the first prism P1 to the third prism P3 may have different Abbe numbers. The optical path folding member including the prisms P1, P2, and P3 having the different optical characteristics as described above may be advantageous in improving the resolution and aberration of the imaging lens system.

The first prism P1 to the third prism P3 may mitigate the flare phenomenon. In an example, inclined surfaces Pc1, Pc21, Pc22, and Pc3 may be respectively disposed on the first prism P1 to the third prism P3. The inclined surfaces Pc1, Pc21, Pc22, and Pc3 may be disposed at portions where the first prism P1 to the third prism P3 oppose each other. For example, the first inclined surface Pc1 may be disposed adjacent to the exit surface of the first prism P1, the second inclined surface Pc21 may be disposed adjacent to an incident surface of the second prism P2, the third slope Pc22 may be disposed adjacent to the exit surface of the second prism P2, and the fourth inclined plane Pc3 may be disposed adjacent to the incident surface of the third prism P3.

The inclined surfaces Pc1, Pc21, Pc22, and Pc3 may be substantially parallel to reflected light inside the optical path folding member. In an example, the first inclined surface Pc1 may be parallel to light reflected from a reflective surface P1SR of the first prism P1, the second inclined surface Pc21 and the third inclined surface Pc22 may be parallel to light reflected from a reflective surface P2SR of the second prism P2, and the fourth inclined surface Pc3 may be parallel to light reflected from a reflective surface P3SR of the third prism P3.

The filter IF and the imaging plane IP may be disposed adjacent to the exit surface of the prism P.

The filter IF may block light of a specific wavelength. For example, the filter IF, in accordance with one or more embodiments, may block infrared light. However, this is only an example, and a type of light blocked by the filter IF is not limited to the infrared light. In an example, the filter IF may block ultraviolet or visible light.

The imaging plane IP may be disposed at a point at which light reflected from the prism P converges or forms an image, and may be formed by an image sensor IS or the like. In an example, the imaging plane IP may be formed on, or inside, the image sensor IS.

Figure 9:
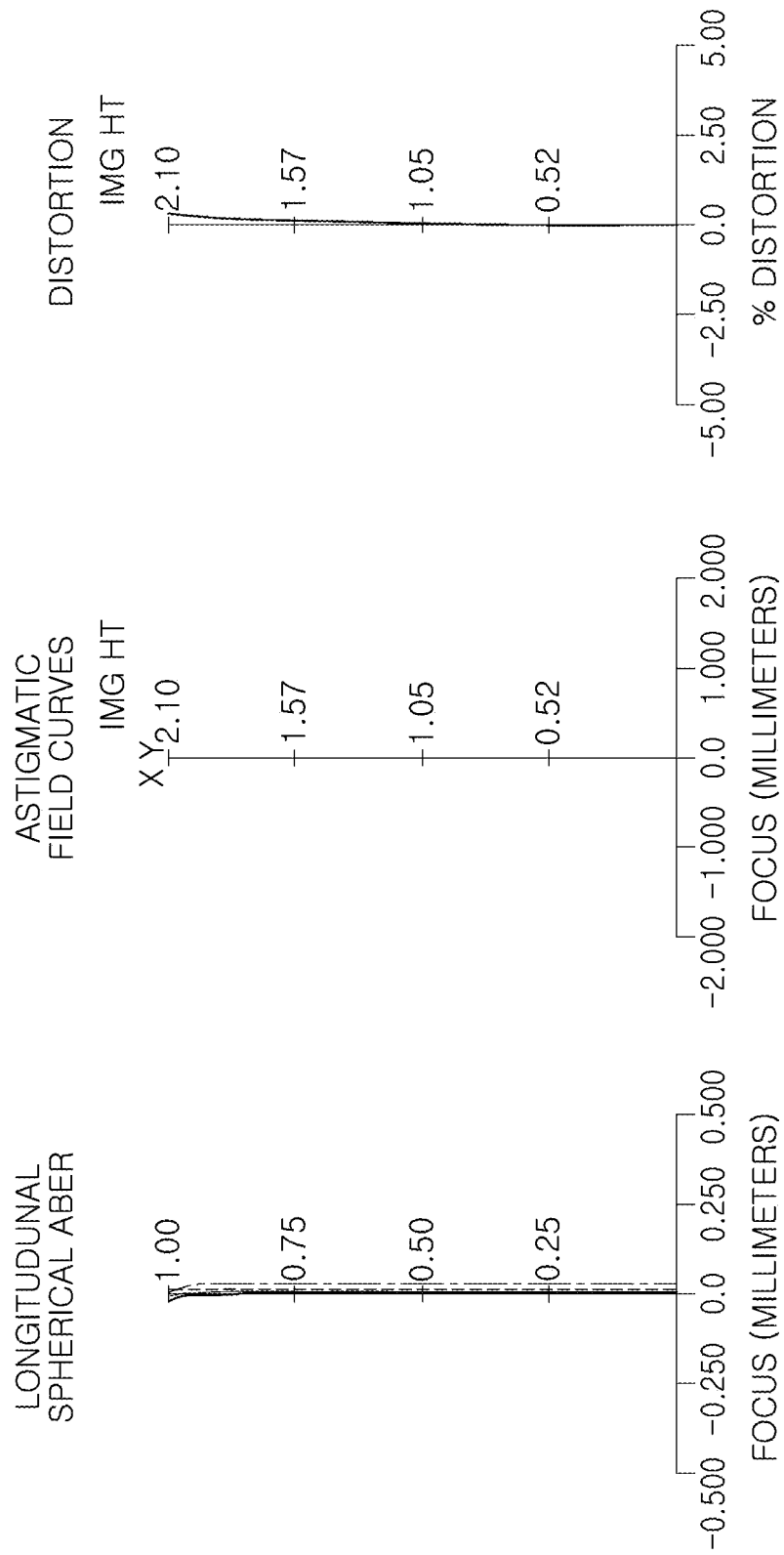
FIG. 9 illustrates an aberration curve of the example imaging lens system illustrated in FIG. 1.

The imaging lens system 100 configured as above may show aberration characteristics illustrated in FIG. 9. Tables 1 and 2 below each show the lens characteristics and aspherical value of the imaging lens system, in accordance with this embodiment.

TABLE 1

| Surface no. | Component | Radius of curvature | Thickness/ Distance | Refractive index | Abbe number |
|---|---|---|---|---|---|
| S1 | First lens | 6.3057 | 1.400 | 1.537 | 55.7 |
| S2 | | 167.727 | 0.300 | | |
| S3 | Second lens | 429.758 | 0.600 | 1.668 | 20.4 |
| S4 | | 54.126 | 0.200 | | |
| S5 | Third lens | 4.7978 | 0.600 | 1.546 | 56.0 |
| S6 | | 6.3194 | 0.150 | | |
| S7 | Fourth lens | 5.5711 | 0.500 | 1.620 | 25.9 |
| S8 | | 3.3441 | 1.000 | | |
| S9 | First prism | Infinity | 2.500 | 1.519 | 64.2 |
| S10 | | Infinity | 3.000 | 1.519 | 64.2 |
| S11 | | Infinity | 0.500 | | |
| S12 | Second prism | Infinity | 4.000 | 1.519 | 64.2 |
| S13 | | Infinity | 0.500 | | |
| S14 | Third prism | Infinity | 3.000 | 1.519 | 64.2 |
| S15 | | Infinity | 2.500 | 1.519 | 64.2 |
| S16 | | Infinity | 0.500 | | |
| S17 | Filter | Infinity | 0.210 | 1.519 | 64.2 |
| S18 | | Infinity | 0.334 | | |
| S19 | Imaging plane | Infinity | 0.001 | | |

TABLE 2

| Surface no. | S1 | S2 | S3 | S4 |
|---|---|---|---|---|
| K | −5.700E−02 | −1.140E+03 | −2.230E+03 | 2.250E+01 |
| A | −3.350E−05 | 1.830E−05 | −8.500E−06 | 1.030E−05 |
| B | −1.020E−06 | 4.040E−07 | 2.890E−07 | 9.240E−07 |
| C | 7.380E−08 | −3.130E−08 | 7.420E−08 | 2.940E−07 |
| D | 2.420E−08 | −1.390E−08 | 1.710E−08 | 7.150E−08 |
| E | 4.440E−09 | −4.240E−09 | 5.290E−09 | 1.230E−08 |
| F | 6.150E−10 | −9.970E−10 | 1.470E−09 | 1.230E−09 |
| G | 3.680E−11 | −1.620E−10 | 3.270E−10 | −1.360E−10 |
| H | −1.520E−11 | −6.190E−12 | 5.380E−11 | −1.250E−10 |
| J | −8.190E−12 | 8.240E−12 | 3.620E−12 | −4.770E−11 |

| Surface no. | S5 | S6 | S7 | S8 |
|---|---|---|---|---|
| K | −1.610E−02 | −1.670E−02 | −3.360E−02 | −2.630E−03 |
| A | −2.370E−05 | 2.650E−05 | −3.470E−05 | 1.340E−05 |
| B | −3.010E−06 | 3.230E−06 | −4.820E−06 | −1.810E−05 |
| C | −8.000E−07 | 8.210E−07 | −1.250E−06 | −8.030E−06 |
| D | −2.060E−07 | 2.310E−07 | −4.080E−07 | −2.530E−06 |
| E | −4.490E−08 | 5.560E−08 | −1.270E−07 | −7.130E−07 |
| F | −8.080E−09 | 1.090E−08 | −3.650E−08 | −1.900E−07 |
| G | −1.040E−09 | 1.380E−09 | −9.980E−09 | −4.130E−08 |
| H | 8.630E−12 | −1.170E−10 | −2.640E−09 | −9.220E−09 |
| J | 7.060E−11 | −1.720E−10 | −6.950E−10 | −1.110E−09 |

Figure 10:
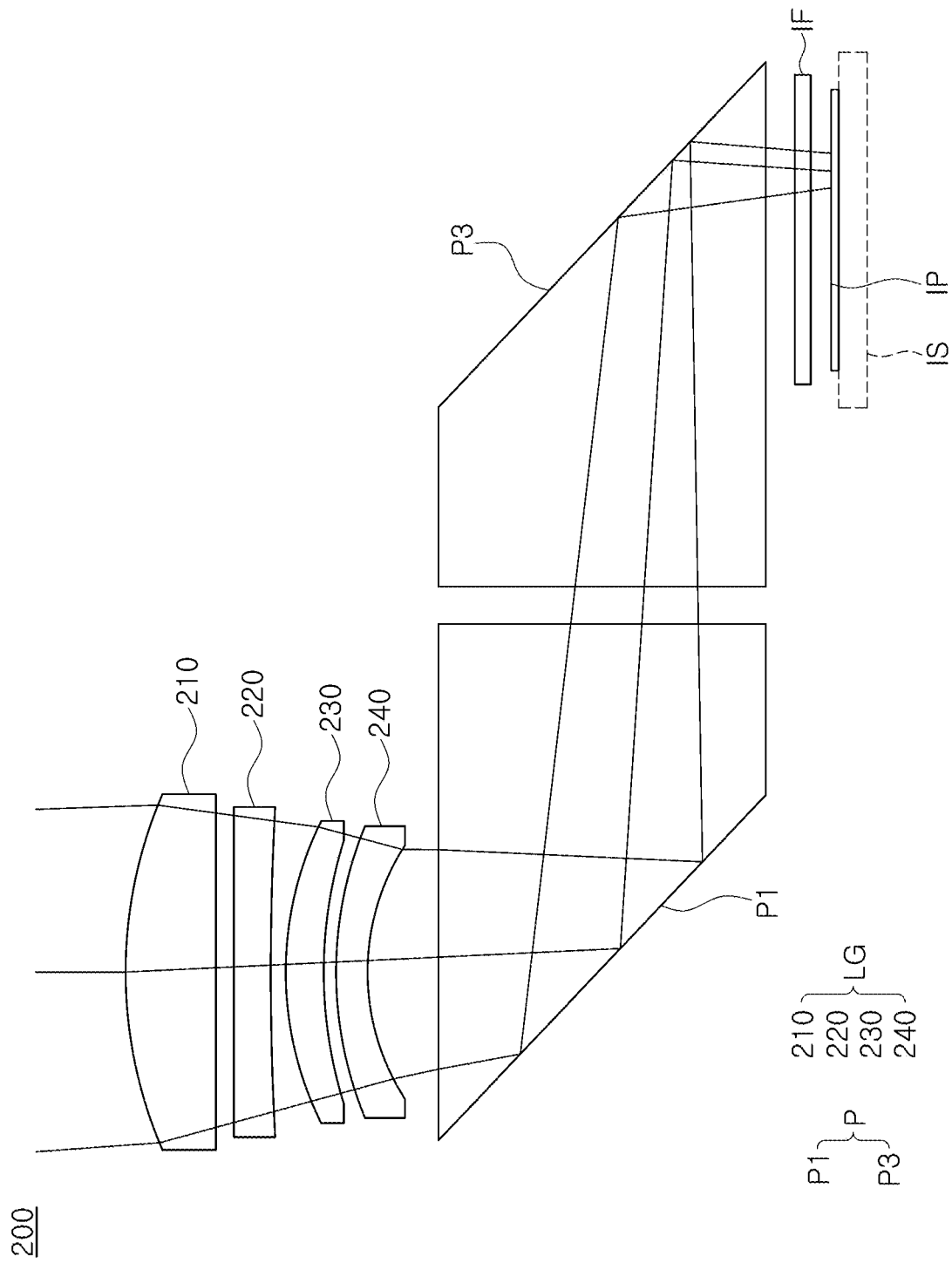
FIG. 10 illustrates a configuration diagram of an example imaging lens system, in accordance with a second embodiment.

An imaging lens system, in accordance with a second embodiment, will be described with reference to FIG. 10.

An example imaging lens system 200, in accordance with a second embodiment, may include a lens group LG and an optical path folding member P. However, components of the imaging lens system 200 are not limited to the above-mentioned members. In an example, the imaging lens system 200 may further include a filter IF and an imaging plane IP. The lens group LG and the optical path folding member P may be sequentially disposed from the object side to the imaging plane. In an example, the lens group LG may be disposed on an object side of the optical path folding member P, and the optical path folding member P may be disposed between the lens group LG and the imaging plane IP.

Next, the above-mentioned components are described in order.

The lens group LG may include a plurality of lenses. For example, the lens group LG may include a first lens 210, a second lens 220, a third lens 230, and a fourth lens 240 sequentially arranged from the object side to the imaging plane. The first lens 210 to the fourth lens 240 may be arranged at a predetermined interval. In an example, an image-side surface of the first lens 210 may not be in contact with an object-side surface of the second lens 220, and an image-side surface of the second lens 220 may not be in contact with an object-side surface of the third lens 230. However, the first lens 210 to the fourth lens 240 may not necessarily be arranged spatially separate from each other. In an example, the image-side surface of the first lens 210 may be in contact with the object-side surface of the second lens 220, and the image-side surface of the second lens 220 may be in contact with the object-side surface of the third lens 230.

Next, the characteristics of the first lens 210 to the fourth lens 240 will be described.

The first lens 210 may have positive refractive power, and may have a convex object-side surface and a concave image-side surface. The second lens 220 may have positive refractive power, and may have a convex object-side surface and a concave image-side surface. The third lens 230 may have positive refractive power, and may have a convex object-side surface and a concave image-side surface. The fourth lens 240 may have negative refractive power, and may have a convex object-side surface and a concave image-side surface.

Next, the optical path folding member P will be described.

The optical path folding member P may include a plurality of prisms P1 and P3. For example, the optical path folding member P may include the first prism P1 and the third prism P3 sequentially disposed along the optical path. The optical path folding member P may have a plurality of reflective surfaces. For example, the optical path folding member P may have two reflective surfaces. As a specific example, one reflective surface may be disposed on each of the first prism P1 and the third prism P3.

The optical path folding member P may adjust the amount of incident light and the amount of emitted light. In an example, a portion of each of the first prism P1 and the third prism P3 other than the entrance EP and the exit OP, as illustrated in FIGS. 2 and 4, may be covered by the light-shielding film, the light-shielding paint, or the like.

The filter IF and the imaging plane IP may be disposed adjacent to the exit surface of the prism P.

The filter IF may block light of a specific wavelength. In an example, the filter IF according to this embodiment may block infrared light. However, this is only an example, and a type of light blocked by the filter IF is not limited to the infrared light. In an example, the filter IF may block ultraviolet or visible light.

The imaging plane IP may be disposed at a point at which light reflected from the prism P converges or forms an image, and may be formed by an image sensor IS or the like. In an example, the imaging plane IP may be formed on, or inside, the image sensor IS.

Figure 11:
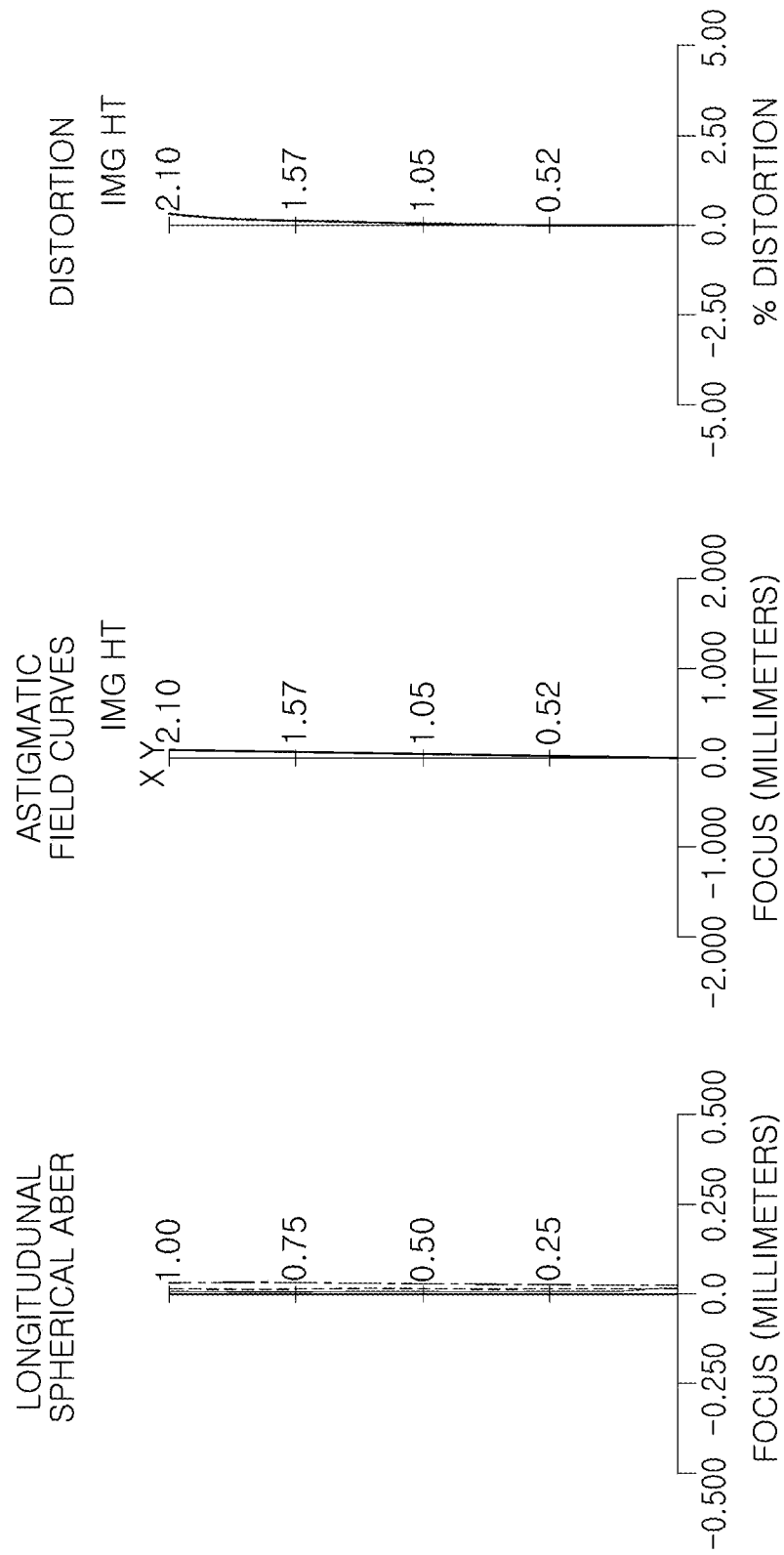
FIG. 11 illustrates an aberration curve of the example imaging lens system illustrated in FIG. 10.

The example imaging lens system 200 configured as above may show aberration characteristics illustrated in FIG. 11. Tables 3 and 4 below each show the lens characteristics and aspherical value of the example imaging lens system according to this embodiment.

TABLE 3

| Surface no. | Component | Radius of curvature | Thickness/ Distance | Refractive index | Abbe number |
|---|---|---|---|---|---|
| S1 | First lens | 6.1155 | 1.400 | 1.537 | 55.7 |
| S2 |  | 6680.474 | 0.300 |  |  |
| S3 | Second lens | 137.211 | 0.600 | 1.668 | 20.4 |
| S4 |  | 253.331 | 0.200 |  |  |
| S5 | Third lens | 5.0441 | 0.600 | 1.546 | 56.0 |
| S6 |  | 7.5884 | 0.150 |  |  |
| S7 | Fourth lens | 7.4045 | 0.500 | 1.620 | 25.9 |
| S8 |  | 3.2403 | 1.000 |  |  |
| S9 | First prism | Infinity | 2.500 | 1.519 | 64.2 |
| S10 |  | Infinity | 5.000 | 1.519 | 64.2 |
| S11 |  | Infinity | 0.500 |  |  |
| S12 | Second prism | Infinity | 5.000 | 1.519 | 64.2 |
| S13 |  | Infinity | 2.500 | 1.519 | 64.2 |
| S14 |  | Infinity | 0.500 |  |  |
| S15 | Filter | Infinity | 0.210 | 1.519 | 64.2 |
| S16 |  | Infinity | 0.500 |  |  |
| S17 | Imaging plane | Infinity | 0.005 |  |  |

TABLE 4

| Surface no. | S1 | S2 | S3 | S4 |
|---|---|---|---|---|
| K | −1.210E−01 | 5.690E+05 | −6.040E+03 | 7.160E+02 |
| A | −8.370E−05 | 3.530E−05 | −4.450E−05 | 5.350E−05 |
| B | 1.090E−06 | −2.350E−06 | −2.530E−06 | 8.370E−06 |
| C | 2.610E−07 | −8.660E−07 | 2.120E−07 | 7.060E−07 |
| D | −1.450E−08 | −1.580E−07 | 8.120E−08 | 6.300E−08 |
| E | −8.590E−09 | −2.620E−08 | 1.630E−08 | 8.770E−09 |
| F | −1.650E−09 | −4.250E−09 | 2.660E−09 | 1.790E−09 |
| G | −2.350E−10 | −6.450E−10 | 3.370E−10 | 3.720E−10 |
| H | −3.140E−11 | −7.840E−11 | 1.330E−11 | 6.490E−11 |
| J | −5.150E−12 | −2.740E−12 | −1.170E−11 | 7.420E−12 |

| Surface no. | S5 | S6 | S7 | S8 |
|---|---|---|---|---|
| K | −7.470E−02 | −1.420E−01 | 1.410E−01 | −9.750E−02 |
| A | −9.190E−05 | −4.400E−05 | 8.250E−05 | −5.580E−04 |
| B | −2.720E−05 | 1.540E−05 | −1.230E−05 | −5.440E−05 |
| C | −3.400E−06 | 1.670E−06 | −1.340E−06 | −1.560E−05 |
| D | −4.370E−07 | 1.640E−07 | −1.480E−07 | −3.940E−06 |
| E | −6.870E−08 | 3.270E−08 | −4.350E−08 | −7.510E−07 |
| F | −1.240E−08 | 8.110E−09 | −1.340E−08 | −1.010E−07 |
| G | −2.150E−09 | 1.070E−09 | −2.570E−09 | 7.350E−10 |
| H | −2.800E−10 | −3.020E−10 | −7.570E−12 | 2.800E−09 |
| J | 2.000E−12 | −2.910E−10 | 2.380E−10 | 1.050E−09 |

Figure 12:
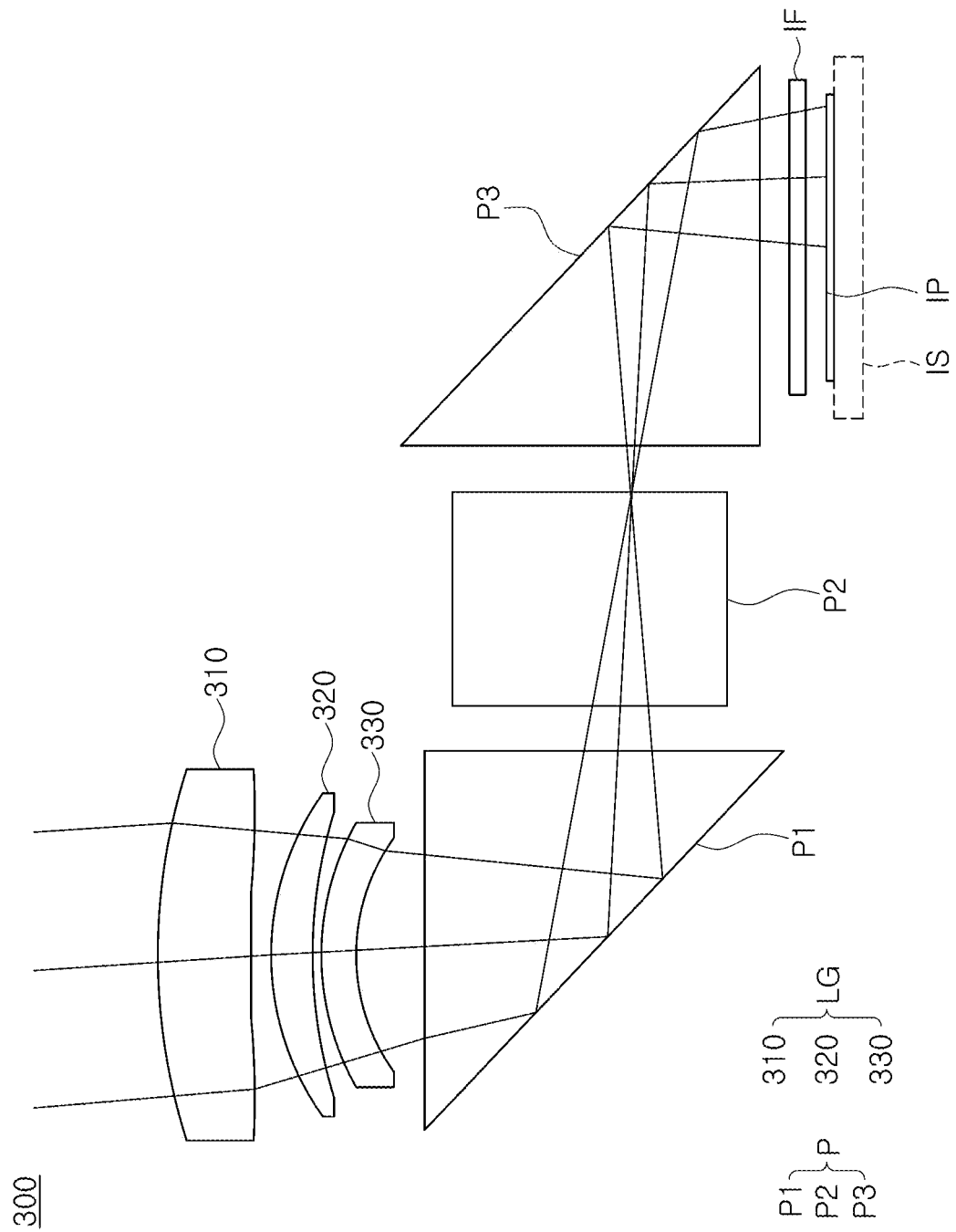
FIG. 12 illustrates a configuration diagram of an example imaging lens system, in accordance with a third embodiment.

An example imaging lens system, in accordance with a third embodiment, will be described with reference to FIG. 12.

An example imaging lens system 300 according to a third embodiment may include a lens group LG and an optical path folding member P. However, components of the imaging lens system 300 are not limited to the above-mentioned members. In an example, the imaging lens system 300 may further include a filter IF and an imaging plane IP. The lens group LG and the optical path folding member P may be sequentially disposed from the object side to the imaging plane. In an example, the lens group LG may be disposed on an object side of the optical path folding member P, and the optical path folding member P may be disposed between the lens group LG and the imaging plane IP.

Next, the above-mentioned components are described in order.

The lens group LG may include a plurality of lenses. For example, the lens group LG may include a first lens 310, a second lens 320, and a third lens 330 sequentially arranged from the object side to the imaging plane. The first lens 310 to the third lens 330 may be arranged at a predetermined interval. In an example, an image-side surface of the first lens 310 may not be in contact with an object-side surface of the second lens 320, and an image-side surface of the second lens 320 may not be in contact with an object-side surface of the third lens 330. However, the first lens 310 to the third lens 330 may not necessarily be arranged spatially apart from each other. In an example, the image-side surface of the first lens 310 may be in contact with the object-side surface of the second lens 320, and the image-side surface of the second lens 320 may be in contact with the object-side surface of the third lens 330.

Next, the characteristics of the first lens 310 to the third lens 330 will be described.

The first lens 310 may have positive refractive power, and may have a convex object-side surface and a concave image-side surface. The second lens 320 may have positive refractive power, and may have a convex object-side surface and a concave image-side surface. The third lens 330 may have negative refractive power, and may have a convex object-side surface and a concave image-side surface.

Next, the optical path folding member P will be described.

The optical path folding member P may include a plurality of prisms P1, P2, and P3. In an example, the optical path folding member P may include the first prism P1, the second prism P2, and the third prism P3 sequentially arranged along the optical path. The optical path folding member P may have a plurality of reflective surfaces. In an example, the optical path folding member P may have two reflective surfaces. As a specific example, one reflective surface may be disposed on each of the first prism P1 and the third prism P3.

The optical path folding member P may adjust the amount of incident light and the amount of emitted light. In an example, a portion of each of the first prism P1, the second prism P2, and the third prism P3 other than the entrance EP and the exit OP, as illustrated in FIGS. 2 through 4, may be covered by the light-shielding film, the light-shielding paint, or the like.

The filter IF and the imaging plane IP may be disposed adjacent to the exit surface of the prism P.

The filter IF may block light of a specific wavelength. In an example, the filter IF according to this embodiment may block infrared light. However, this is only an example, and a type of light blocked by the filter IF is not limited to the infrared light. In an example, the filter IF may block ultraviolet or visible light.

The imaging plane IP may be disposed at the point at which light reflected from the prism P converges or forms an image, and may be formed by an image sensor IS or the like. For example, the imaging plane IP may be formed on, or inside, the image sensor IS.

Figure 13:
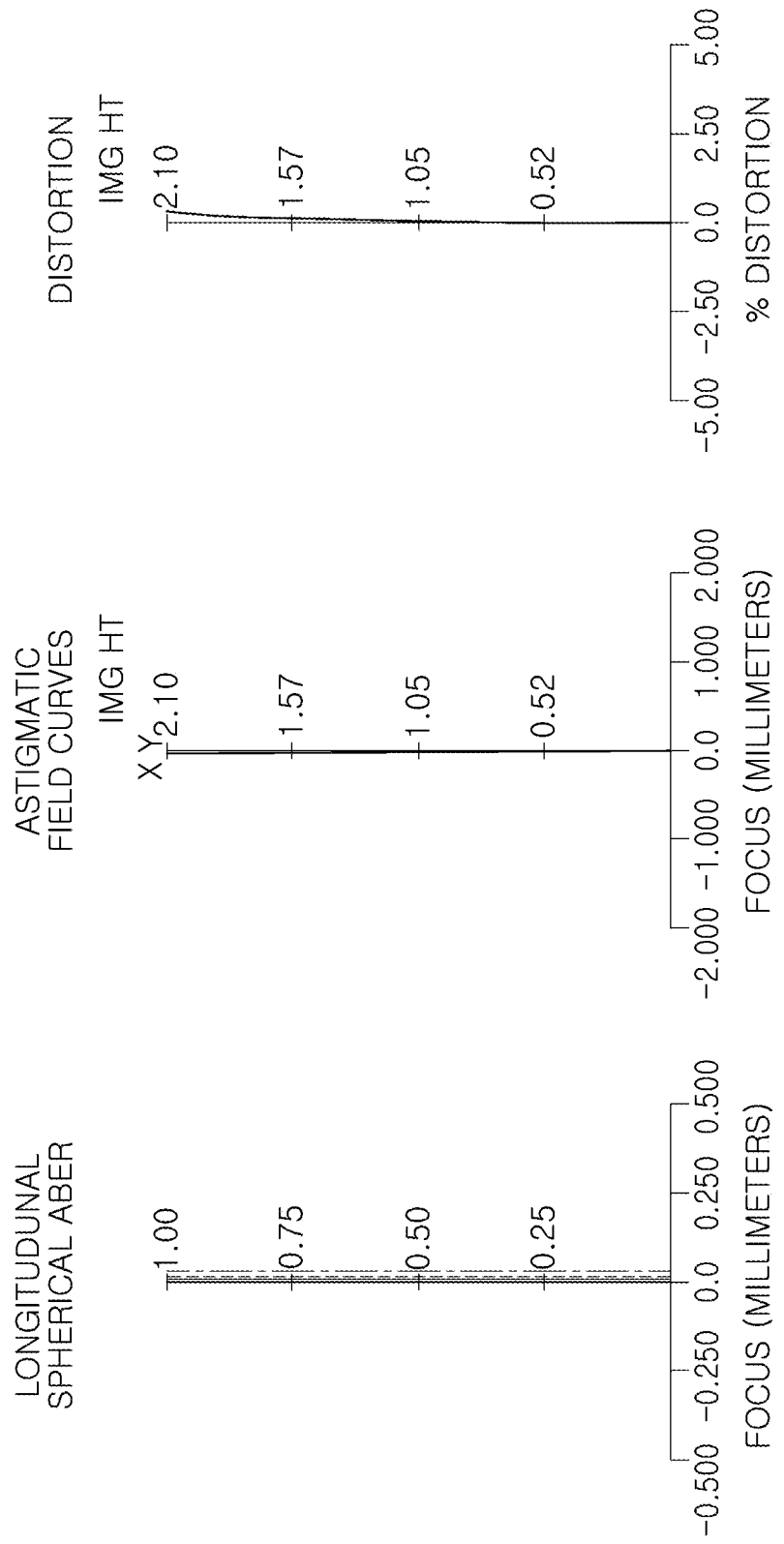
FIG. 13 illustrates an aberration curve of the example imaging lens system illustrated in FIG. 12.

The imaging lens system 300 configured as above may show aberration characteristics illustrated in FIG. 13. Tables 5 and 6 below each show the lens characteristics and aspherical value of the imaging lens system according to this embodiment.

TABLE 5

| Surface no. | Component | Radius of curvature | Thickness/ Distance | Refractive index | Abbe number |
|---|---|---|---|---|---|
| S1 | First lens | 8.0938 | 1.400 | 1.537 | 55.7 |
| S2 | | 27.535 | 0.300 | | |
| S3 | Second lens | 3.5912 | 0.600 | 1.546 | 56.0 |
| S4 | | 6.1365 | 0.150 | | |
| S5 | Third lens | 3.7308 | 0.500 | 1.668 | 20.4 |
| S6 | | 2.5271 | 1.000 | | |
| S7 | First prism | Infinity | 2.500 | 1.519 | 64.2 |
| S8 | | Infinity | 3.000 | 1.519 | 64.2 |
| S9 | | Infinity | 0.500 | | |
| S10 | Second prism | Infinity | 3.000 | 1.519 | 64.2 |
| S11 | | Infinity | 0.500 | | |
| S12 | Third prism | Infinity | 3.000 | 1.519 | 64.2 |
| S13 | | Infinity | 2.500 | 1.519 | 64.2 |
| S14 | | Infinity | 0.500 | | |
| S15 | Filter | Infinity | 0.210 | 1.519 | 64.2 |
| S16 | | Infinity | 0.244 | | |
| S17 | Imaging plane | Infinity | 0.003 | | |

TABLE 6

| Surface no. | S1 | S2 | S3 |
|---|---|---|---|
| K | −4.830E−02 | 1.660E+00 | −7.850E−03 |
| A | −1.510E−05 | −1.140E−05 | 6.940E−06 |
| B | 1.160E−05 | 6.450E−06 | −2.420E−05 |
| C | 2.550E−06 | 1.440E−06 | −8.360E−06 |
| D | 3.650E−07 | −7.670E−08 | −1.780E−06 |
| E | 1.700E−08 | −1.310E−07 | −2.740E−07 |
| F | −1.050E−08 | −4.880E−08 | −2.500E−08 |
| G | −4.260E−09 | −1.190E−08 | 7.920E−10 |
| H | −7.500E−10 | −1.680E−09 | 2.570E−10 |
| J | 1.100E−10 | 2.420E−10 | −5.230E−10 |

| Surface no. | S4 | S5 | S6 |
|---|---|---|---|
| K | −4.210E−03 | 3.000E−03 | −9.730E−03 |
| A | 2.710E−05 | −8.950E−06 | −1.620E−06 |
| B | 2.360E−05 | −1.400E−05 | −1.080E−04 |
| C | 6.550E−06 | −5.490E−06 | −5.370E−05 |
| D | 1.130E−06 | −1.640E−06 | −1.870E−05 |
| E | 8.540E−08 | −4.490E−07 | −5.020E−06 |
| F | −2.270E−08 | −1.240E−07 | −8.430E−07 |
| G | −1.000E−08 | −3.260E−08 | 6.310E−08 |
| H | −6.300E−10 | −5.040E−09 | 5.860E−08 |
| J | 1.380E−09 | 2.540E−09 | −2.770E−08 |

Figure 14:
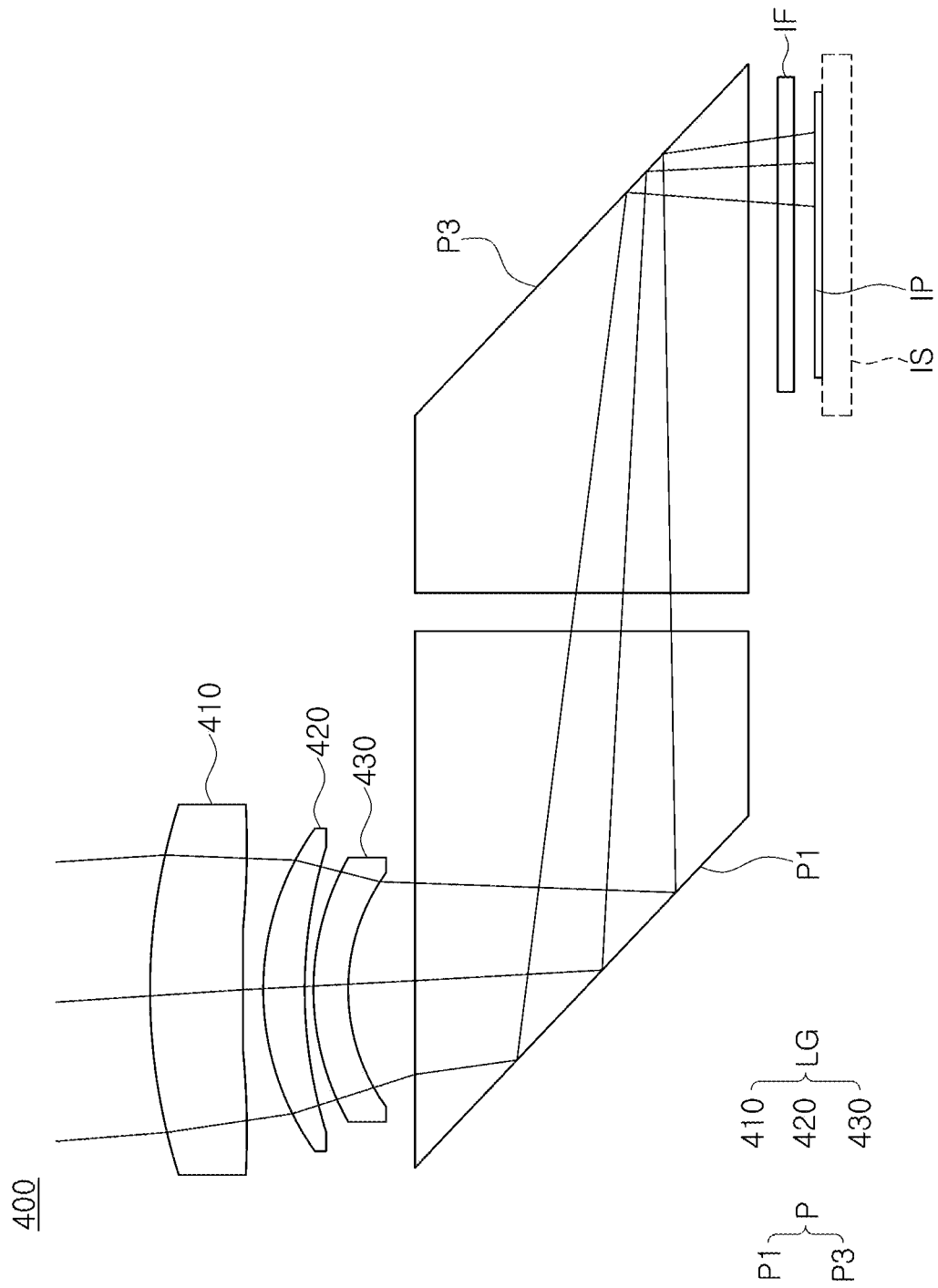
FIG. 14 illustrates a configuration diagram of an example imaging lens system, in accordance with a fourth embodiment.

An example imaging lens system, in accordance with a fourth embodiment, will be described with reference to FIG. 14.

An example imaging lens system 400 according to this embodiment may include a lens group LG and an optical path folding member P. However, components of the imaging lens system 400 are not limited to the above-mentioned members. In an example, the imaging lens system 400 may further include a filter IF and an imaging plane IP. The lens group LG and the optical path folding member P may be sequentially disposed from the object side to the imaging plane. In an example, the lens group LG may be disposed on an object side of the optical path folding member P, and the optical path folding member P may be disposed between the lens group LG and the imaging plane IP.

Next, the above-mentioned components are described in order.

The lens group LG may include a plurality of lenses. In an example, the lens group LG may include a first lens 410, a second lens 420, and a third lens 430 sequentially arranged from the object side to the imaging plane. The first lens 410 to the third lens 430 may be arranged at a predetermined interval. For example, an image-side surface of the first lens 410 may not be in contact with an object-side surface of the second lens 420, and an image-side surface of the second lens 420 may not be in contact with an object-side surface of the third lens 430. However, the first lens 410 to the third lens 430 may not necessarily be arranged spatially separate from each other. In an example, the image-side surface of the first lens 410 may be in contact with the object-side surface of the second lens 420, and the image-side surface of the second lens 420 may be in contact with the object-side surface of the third lens 430.

Next, the characteristics of the first lens 410 to the third lens 430 will be described.

The first lens 410 may have positive refractive power, and may have a convex object-side surface and a concave image-side surface. The second lens 420 may have positive refractive power, and may have a convex object-side surface and a concave image-side surface. The third lens 430 may have negative refractive power, and may have a convex object-side surface and a concave image-side surface.

Next, the optical path folding member P will be described.

The optical path folding member P may include a plurality of prisms P1 and P3. In an example, the optical path folding member P may include the first prism P1 and the third prism P3 sequentially disposed along the optical path. The optical path folding member P may have a plurality of reflective surfaces. In an example, the optical path folding member P may have two reflective surfaces. As a specific example, one reflective surface may be disposed on each of the first prism P1 and the third prism P3.

The optical path folding member P may adjust the amount of incident light and the amount of emitted light. In an example, a portion of each of the first prism P1 and the third prism P3 other than the entrance EP and the exit OP, as illustrated in FIGS. 2 to 4, may be covered by the light-shielding film, the light-shielding paint, or the like.

The filter IF and the imaging plane IP may be disposed adjacent to the exit surface of the prism P.

The filter IF may block light of a specific wavelength. In an example, the filter IF according to this embodiment may block infrared light. However, this is only an example, and a type of light blocked by the filter IF is not limited to the infrared light. In an example, the filter IF may block ultraviolet or visible light.

The imaging plane IP may be disposed at a point at which light reflected from the prism P converges or forms an image, and may be formed by an image sensor IS or the like. In an example, the imaging plane IP may be formed on, or inside, the image sensor IS.

Figure 15:
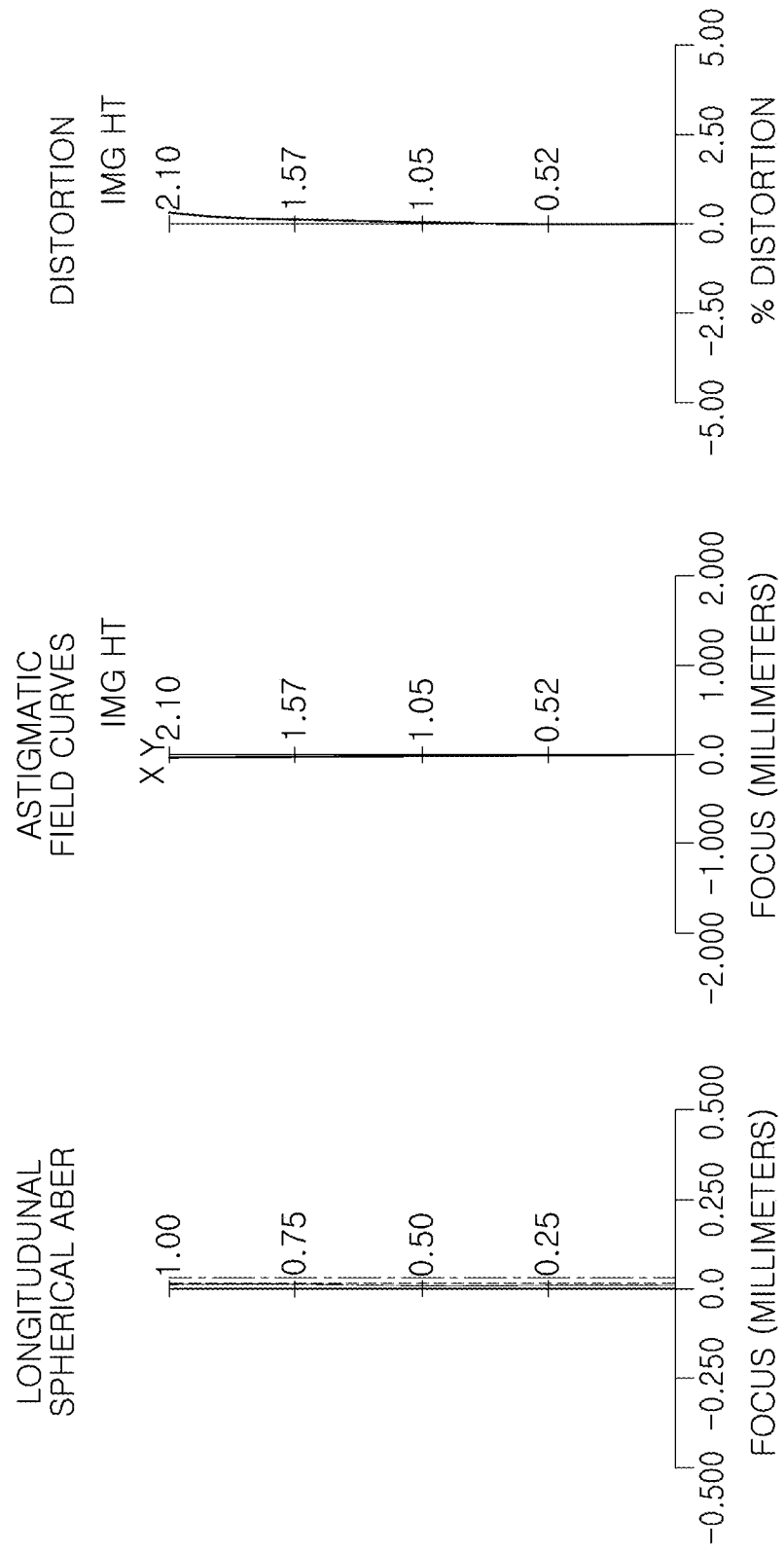
FIG. 15 illustrates an aberration curve of the example imaging lens system illustrated in FIG. 14.

The imaging lens system 400 configured as above may show aberration characteristics illustrated in FIG. 15. Tables 7 and 8 below each show the lens characteristics and aspherical value of the imaging lens system in accordance with this embodiment.

TABLE 7

| Surface no. | Component | Radius of curvature | Thickness/ Distance | Refractive index | Abbe number |
|---|---|---|---|---|---|
| S1 | First lens | 8.2689 | 1.400 | 1.537 | 55.7 |
| S2 | | 35.4841 | 0.300 | | |
| S3 | Second lens | 3.5988 | 0.600 | 1.546 | 56.0 |
| S4 | | 5.8750 | 0.150 | | |
| S5 | Third lens | 3.7972 | 0.500 | 1.668 | 20.4 |
| S6 | | 2.5753 | 1.000 | | |
| S7 | First prism | Infinity | 2.500 | 1.519 | 64.2 |
| S8 | | Infinity | 5.000 | 1.519 | 64.2 |
| S9 | | Infinity | 0.500 | | |

TABLE 7-continued

| Surface no. | Component | Radius of curvature | Thickness/ Distance | Refractive index | Abbe number |
|---|---|---|---|---|---|
| S10 | Second prism | Infinity | 5.000 | 1.519 | 64.2 |
| S11 | | Infinity | 2.500 | 1.519 | 64.2 |
| S12 | | Infinity | 0.500 | | |
| S13 | Filter | Infinity | 0.210 | 1.519 | 64.2 |
| S14 | | Infinity | 0.097 | | |
| S15 | Imaging plane | Infinity | 0.003 | | |

TABLE 8

| Surface no. | S1 | S2 | S3 |
|---|---|---|---|
| K | −3.640E−03 | 1.740E−01 | −5.160E−03 |
| A | −2.950E−06 | −3.240E−07 | −1.280E−06 |
| B | 5.350E−06 | 5.960E−06 | −1.450E−05 |
| C | 1.600E−06 | 1.500E−06 | −5.100E−06 |
| D | 3.260E−07 | 1.690E−07 | −1.190E−06 |
| E | 4.700E−08 | −1.790E−08 | −2.210E−07 |
| F | 2.660E−09 | −1.640E−08 | −3.170E−08 |
| G | −1.090E−09 | −5.800E−09 | −2.570E−09 |
| H | −4.790E−10 | −1.500E−09 | 3.030E−10 |
| J | −9.720E−11 | −2.870E−10 | 1.600E−10 |

| Surface no. | S4 | S5 | S6 |
|---|---|---|---|
| K | 5.130E−02 | −6.750E−04 | −7.070E−03 |
| A | 2.300E−05 | 5.640E−07 | −1.070E−05 |
| B | 1.470E−05 | −2.290E−06 | −7.070E−05 |
| C | 4.680E−06 | −1.820E−06 | −3.400E−05 |
| D | 1.070E−06 | −6.970E−07 | −1.250E−05 |
| E | 1.890E−07 | −2.350E−07 | −3.840E−06 |
| F | 2.410E−08 | −8.170E−08 | −9.470E−07 |
| G | 9.610E−10 | −2.870E−08 | −1.530E−07 |
| H | −5.060E−10 | −9.240E−09 | −5.210E−09 |
| J | −1.290E−10 | −2.240E−09 | −9.110E−09 |

Figure 16:
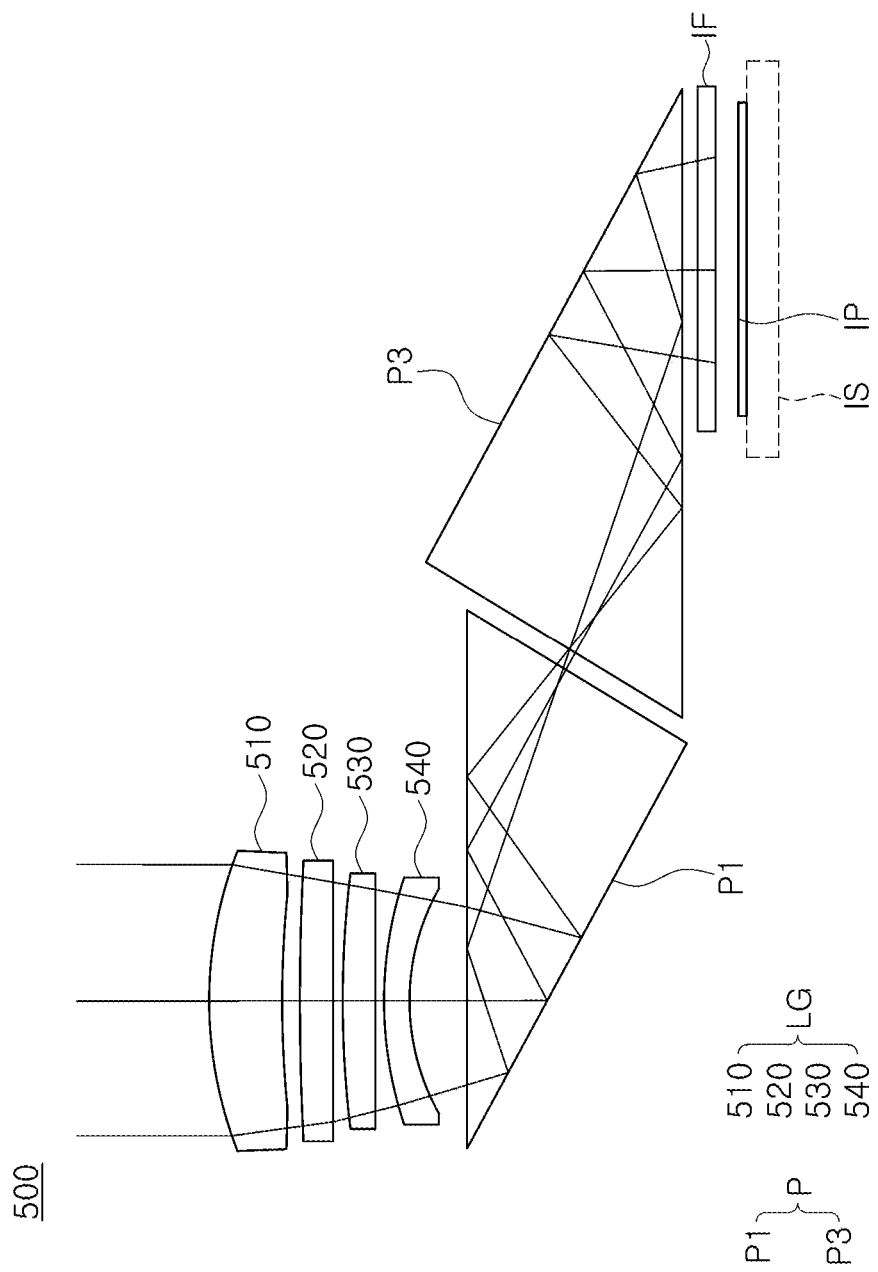
FIG. 16 illustrates a configuration diagram of an example imaging lens system, in accordance with a fifth embodiment.

An example imaging lens system, in accordance with a fifth embodiment will be described with reference to FIG. 16.

An example imaging lens system 500, in accordance with a fifth embodiment, may include a lens group LG and an optical path folding member P (P1 and P3). However, components of the imaging lens system 500 are not limited to the above-mentioned members. For example, the imaging lens system 500 may further include a filter IF and an imaging plane IP. The lens group LG and the optical path folding member P may be sequentially disposed from the object side to the imaging plane. In an example, the lens group LG may be disposed on an object side of the optical path folding member P, and the optical path folding member P may be disposed between the lens group LG and the imaging plane IP.

Next, the above-mentioned components are described in order.

The lens group LG may include a plurality of lenses. In an example, the lens group LG may include a first lens 510, a second lens 520, a third lens 530, and a fourth lens 540 sequentially arranged from the object side to the imaging plane. The first lens 510 to the fourth lens 540 may be arranged at a predetermined interval. In an example, an image-side surface of the first lens 510 may not be in contact with an object-side surface of the second lens 520, and an image-side surface of the second lens 520 may not be in contact with an object-side surface of the third lens 530. However, the first lens 510 to the fourth lens 540 may not necessarily be arranged spatially separate from each other. In an example, the image-side surface of the first lens 510 may be in contact with the object-side surface of the second lens 520, and the image-side surface of the second lens 520 may be in contact with the object-side surface of the third lens 530.

Next, the characteristics of the first lens 510 to the fourth lens 540 will be described.

The first lens 510 may have positive refractive power, and may have a convex object-side surface and a concave image-side surface. The second lens 520 may have positive refractive power, and may have a convex object-side surface and a concave image-side surface. The third lens 530 may have positive refractive power, and may have a convex object-side surface and a concave image-side surface. The fourth lens 540 may have negative refractive power, and may have a convex object-side surface and a concave image-side surface.

Next, the optical path folding member P (P1 and P3) will be described.

The optical path folding member P may include a plurality of prisms P1 and P3. In an example, the optical path folding member P may include the first prism P1 and the third prism P3 sequentially disposed along the optical path. The optical path folding member P may have a plurality of reflective surfaces. In an example, the optical path folding member P may have four reflective surfaces. As a specific example, two reflective surfaces may be disposed on each of the first prism P1 and the third prism P3.

The optical path folding member P may adjust the amount of incident light and the amount of emitted light. In an example, a portion of each of the first prism P1 and the third prism P3 other than an entrance region and an exit region may be covered by the light-shielding film, the light-shielding paint, or the like.

The filter IF and the imaging plane IP may be disposed adjacent to the exit surface of the prism P.

The filter IF may block light of a specific wavelength. In an example, the filter IF according to this embodiment may block infrared light. However, that is only an example, and a type of light blocked by the filter IF is not limited to the infrared light. In an example, the filter IF may block ultraviolet or visible light.

The imaging plane IP may be disposed at the point at which light reflected from the prism P converges or forms an image, and may be formed by an image sensor IS or the like. In an example, the imaging plane IP may be formed on, or inside, the image sensor IS.

Figure 17:
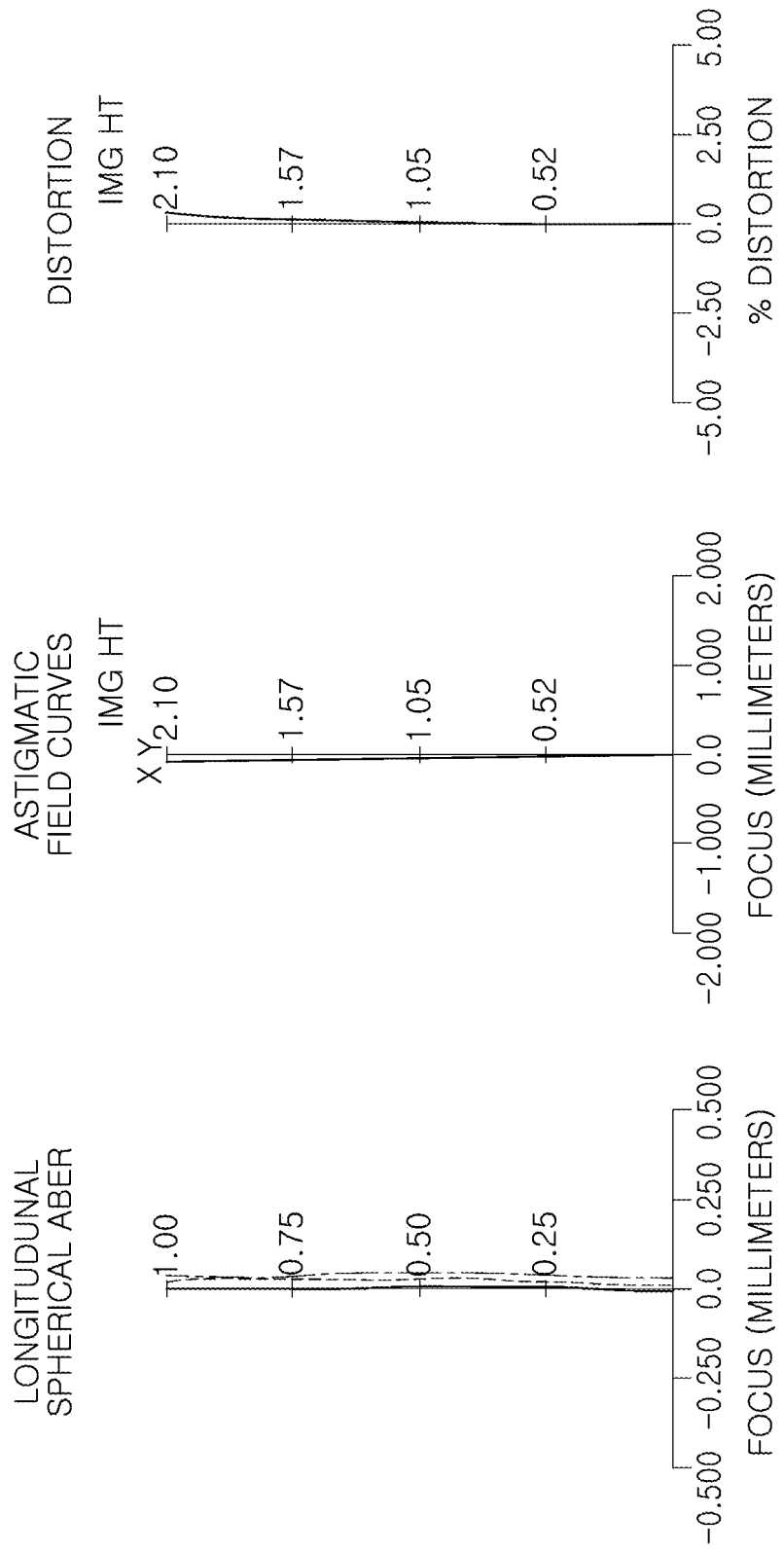
FIG. 17 illustrates an aberration curve of the example imaging lens system illustrated in FIG. 16.

The example imaging lens system 500 configured as above may show aberration characteristics illustrated in FIG. 17. Tables 9 and 10 below each illustrate the lens characteristics and aspherical value of the imaging lens system according to this embodiment.

TABLE 9

| Surface no. | Component | Radius of curvature | Thickness/ Distance | Refractive index | Abbe number |
|---|---|---|---|---|---|
| S1 | First lens | 6.5602 | 1.400 | 1.537 | 55.7 |
| S2 | | 79.3679 | 0.300 | | |
| S3 | Second lens | 97.9657 | 0.600 | 1.668 | 20.4 |
| S4 | | 1122.997 | 0.200 | | |
| S5 | Third lens | 25.4805 | 0.600 | 1.546 | 56.0 |
| S6 | | 280.361 | 0.150 | | |
| S7 | Fourth lens | 6.8578 | 0.500 | 1.668 | 20.4 |
| S8 | | 4.1539 | 1.000 | | |
| S9 | First prism | Infinity | 1.500 | 1.519 | 64.2 |
| S10 | | Infinity | 3.000 | 1.519 | 64.2 |
| S11 | | Infinity | 3.700 | 1.519 | 64.2 |
| S12 | | Infinity | 0.300 | | |

TABLE 9-continued

| Surface no. | Component | Radius of curvature | Thickness/ Distance | Refractive index | Abbe number |
|---|---|---|---|---|---|
| S13 | Second prism | Infinity | 4.000 | 1.519 | 64.2 |
| S14 | | Infinity | 3.700 | 1.519 | 64.2 |
| S15 | | Infinity | 1.850 | 1.519 | 64.2 |
| S16 | | Infinity | 0.300 | | |
| S17 | Filter | Infinity | 0.210 | 1.519 | 64.2 |
| S18 | | Infinity | 0.090 | | |
| S19 | Imaging plane | Infinity | 0.010 | | |

TABLE 10

| Surface no. | S1 | S2 | S3 | S4 |
|---|---|---|---|---|
| K | −2.480E−01 | −5.260E+02 | −2.870E+03 | −3.880E+05 |
| A | −1.360E−04 | 7.070E−05 | −2.790E−05 | 3.670E−06 |
| B | −9.940E−06 | 3.290E−06 | −1.360E−07 | −1.010E−06 |
| C | −6.830E−07 | −6.520E−08 | 3.070E−07 | −2.130E−07 |
| D | −4.670E−08 | −5.170E−08 | 7.380E−08 | −2.610E−08 |
| E | −3.490E−09 | −9.820E−09 | 1.200E−08 | 9.620E−10 |
| F | −2.510E−10 | −1.480E−09 | 1.610E−09 | 1.160E−09 |
| G | −1.550E−11 | −1.860E−10 | 1.700E−10 | 2.660E−10 |
| H | −4.290E−12 | −9.400E−12 | 1.150E−12 | 2.230E−11 |
| J | −2.570E−12 | 6.090E−12 | −8.410E−12 | −8.690E−12 |

| Surface no. | S5 | S6 | S7 | S8 |
|---|---|---|---|---|
| K | 1.050E+00 | −2.010E+02 | 1.790E−01 | −3.640E−02 |
| A | 2.980E−05 | −7.580E−05 | 4.940E−05 | −1.170E−04 |
| B | 3.930E−06 | −7.350E−06 | −3.320E−06 | −2.820E−07 |
| C | 4.620E−07 | −6.770E−06 | −2.030E−06 | 2.680E−06 |
| D | 7.920E−08 | −1.340E−07 | −4.730E−07 | 2.310E−07 |
| E | 8.200E−09 | −2.660E−08 | −1.120E−07 | −1.280E−07 |
| F | −4.760E−10 | −4.720E−09 | −3.030E−08 | −7.780E−08 |
| G | −3.780E−10 | −1.090E−09 | −8.660E−09 | −2.240E−08 |
| H | −5.210E−11 | −4.270E−10 | −2.490E−09 | −7.210E−09 |
| J | 1.970E−11 | −1.960E−10 | −7.100E−10 | −1.430E−09 |

Figure 18:
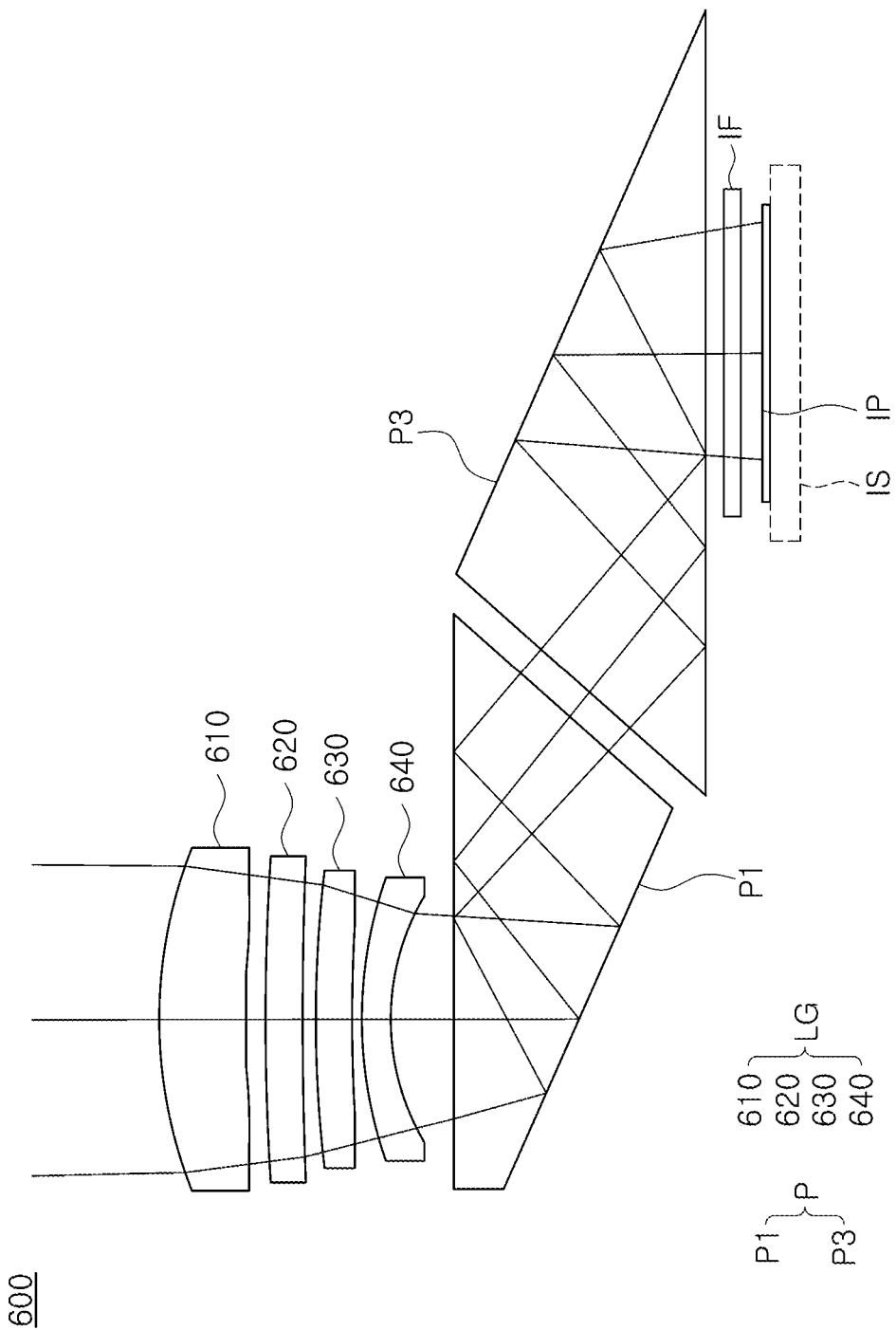
FIG. 18 illustrates a configuration diagram of an example imaging lens system in accordance with a sixth embodiment.

An example imaging lens system, in accordance with a sixth embodiment, will be described with reference to FIG. 18.

An example imaging lens system 600 according to the sixth embodiment may include a lens group LG and an optical path folding member P. However, components of the imaging lens system 600 are not limited to the above-mentioned members. In an example, the imaging lens system 600 may further include a filter IF and an imaging plane IP. The lens group LG and the optical path folding member P may be sequentially disposed from the object side to the imaging plane. In an example, the lens group LG may be disposed on an object side of the optical path folding member P, and the optical path folding member P may be disposed between the lens group LG and the imaging plane IP.

Next, the above-mentioned components are described in order.

The lens group LG may include a plurality of lenses. In an example, the lens group LG may include a first lens 610, a second lens 620, a third lens 630, and a fourth lens 640 sequentially arranged from the object side to the imaging plane. The first lens 610 to the fourth lens 640 may be arranged at a predetermined interval. In an example, an image-side surface of the first lens 610 may not be in contact with an object-side surface of the second lens 620, and an image-side surface of the second lens 620 may not be in contact with an object-side surface of the third lens 630. However, the first lens 610 to the fourth lens 640 may not necessarily be arranged spatially separate from each other. For example, the image-side surface of the first lens 610 may be in contact with the object-side surface of the second lens 620, and the image-side surface of the second lens 620 may be in contact with the object-side surface of the third lens 630.

Next, the characteristics of the first lens 610 to the fourth lens 640 will be described.

The first lens 610 may have positive refractive power, and may have a convex object-side surface and a concave image-side surface. The second lens 620 may have positive refractive power, and may have a convex object-side surface and a concave image-side surface. The third lens 630 may have positive refractive power, and may have a convex object-side surface and a concave image-side surface. The fourth lens 640 may have negative refractive power, and may have a convex object-side surface and a concave image-side surface.

Next, the optical path folding member P will be described.

The optical path folding member P may include a plurality of prisms P1 and P3. In an example, the optical path folding member P may include the first prism P1 and the third prism P3 sequentially disposed along the optical path. The optical path folding member P may have a plurality of reflective surfaces. In an example, the optical path folding member P may have four reflective surfaces. As a specific example, two reflective surfaces may be disposed on each of the first prism P1 and the third prism P3.

The optical path folding member P may adjust the amount of incident light and the amount of emitted light. In an example, a portion of each of the first prism P1 and the third prism P3 other than an entrance region and an exit region may be covered by the light-shielding film, the light-shielding paint, or the like.

The filter IF and the imaging plane IP may be disposed adjacent to the exit surface of the prism P.

The filter IF may block light of a specific wavelength. In an example, the filter IF according to this embodiment may block infrared light. However, this is only an example, and a type of light blocked by the filter IF is not limited to the infrared light. In an example, the filter IF may block ultraviolet or visible light.

The imaging plane IP may be disposed at a point at which light reflected from the prism P converges or forms an image, and may be formed by an image sensor IS or the like. In an example, the imaging plane IP may be formed on, or inside, the image sensor IS.

Figure 19:
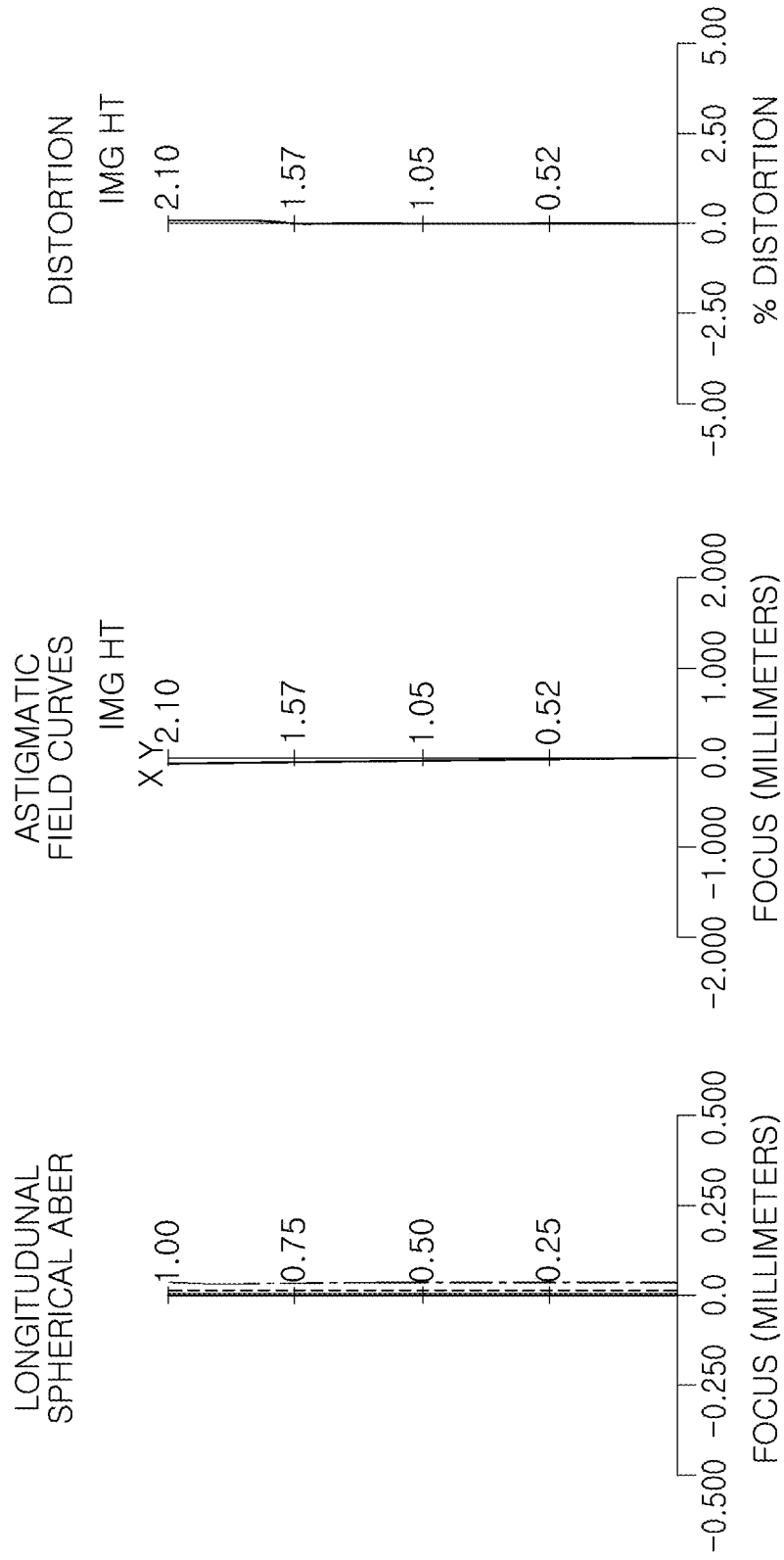
FIG. 19 illustrates an aberration curve of the example imaging lens system illustrated in FIG. 18.

The example imaging lens system 600 configured as above may illustrate aberration characteristics illustrated in FIG. 19. Tables 11 and 12 below each illustrate the lens characteristics and aspherical value of the imaging lens system according to this embodiment.

TABLE 11

| Surface no. | Component | Radius of curvature | Thickness/ Distance | Refractive index | Abbe number |
|---|---|---|---|---|---|
| S1 | First lens | 6.5295 | 1.400 | 1.537 | 55.7 |
| S2 | | 71.2541 | 0.300 | | |
| S3 | Second lens | 33.5535 | 0.600 | 1.668 | 20.4 |
| S4 | | 36.8741 | 0.200 | | |
| S5 | Third lens | 15.2751 | 0.600 | 1.546 | 56.0 |
| S6 | | 38.0680 | 0.150 | | |
| S7 | Fourth lens | 5.7571 | 0.500 | 1.668 | 20.4 |
| S8 | | 3.7105 | 1.000 | | |
| S9 | First prism | Infinity | 2.000 | 1.519 | 64.2 |
| S10 | | Infinity | 3.111 | 1.519 | 64.2 |
| S11 | | Infinity | 2.900 | 1.519 | 64.2 |
| S12 | | Infinity | 0.500 | | |

TABLE 11-continued

| Surface no. | Component | Radius of curvature | Thickness/ Distance | Refractive index | Abbe number |
|---|---|---|---|---|---|
| S13 | Second prism | Infinity | 2.900 | 1.519 | 64.2 |
| S14 | | Infinity | 3.800 | 1.519 | 64.2 |
| S15 | | Infinity | 2.440 | 1.519 | 64.2 |
| S16 | | Infinity | 0.300 | | |
| S17 | Filter | Infinity | 0.210 | 1.519 | 64.2 |
| S18 | | Infinity | 0.096 | | |
| S19 | Imaging plane | Infinity | 0.004 | | |

TABLE 12

| Surface no. | S1 | S2 | S3 | S4 |
|---|---|---|---|---|
| K | −2.480E−01 | −9.900E+01 | −9.900E+01 | −9.900E+01 |
| A | −1.730E−04 | 7.970E−05 | −6.500E−05 | 4.540E−05 |
| B | −5.530E−06 | −3.860E−07 | −1.790E−06 | 3.170E−06 |
| C | 2.410E−08 | −4.040E−07 | 8.540E−08 | 5.130E−07 |
| D | 1.200E−08 | −6.080E−08 | 5.370E−08 | 6.010E−08 |
| E | −2.960E−09 | −6.020E−09 | 1.320E−08 | 3.680E−09 |

TABLE 12-continued

| | | | | |
|---|---|---|---|---|
| F | −1.130E−09 | −2.540E−10 | 2.520E−09 | −5.610E−10 |
| G | −1.850E−10 | 7.900E−11 | 3.700E−10 | −2.710E−10 |
| H | −8.750E−12 | 3.670E−11 | 2.270E−11 | −6.110E−11 |
| J | 5.820E−12 | 1.200E−11 | −1.120E−11 | −7.360E−12 |

| Surface no. | S5 | S6 | S7 | S8 |
|---|---|---|---|---|
| K | 1.050E+00 | −9.900E+01 | 1.790E−01 | −3.640E−02 |
| A | 2.930E−05 | −7.440E−05 | −7.870E−07 | −6.690E−05 |
| B | 5.380E−06 | −7.120E−06 | −7.080E−06 | −1.800E−05 |
| C | 1.550E−07 | 1.930E−07 | −3.070E−06 | −3.260E−06 |
| D | 9.560E−09 | 8.310E−08 | −6.910E−07 | −1.190E−06 |
| E | 6.850E−09 | 8.130E−09 | −1.420E−07 | −3.900E−07 |
| F | 2.240E−09 | −1.560E−10 | −3.090E−08 | −1.030E−07 |
| G | 5.210E−10 | −3.150E−10 | −7.320E−09 | −1.670E−08 |
| H | 1.080E−10 | −1.510E−10 | −1.800E−09 | −3.820E−09 |
| J | 2.390E−11 | −7.230E−11 | −4.330E−10 | −1.090E−09 |

Tables 13 to 15 below each illustrate the optical characteristic values and conditional expression values of the imaging lens systems according to the above-described first to sixth example embodiments.

TABLE 13

| Item | First embodiment | Second embodiment | Third embodiment | Fourth embodiment | Fifth embodiment | Sixth embodiment |
|---|---|---|---|---|---|---|
| f | 18.000 | 18.000 | 16.000 | 16.000 | 18.000 | 18.000 |
| f1 | 12.161 | 11.395 | 20.818 | 19.717 | 13.225 | 13.282 |
| f2 | −92.715 | 446.972 | 14.629 | 15.554 | 160.555 | 519.879 |
| f3 | 32.012 | 25.419 | −14.060 | −14.322 | 51.259 | 46.267 |
| f4 | −14.761 | −9.741 | — | — | −17.025 | −17.311 |
| TTL | 21.794 | 21.465 | 19.906 | 20.260 | 23.410 | 23.011 |
| BFL | 18.044 | 17.715 | 16.956 | 17.310 | 19.660 | 19.261 |
| ImgHT | 2.100 | 2.100 | 2.100 | 2.100 | 2.400 | 2.400 |

TABLE 14

| Conditional expression | First embodiment | Second embodiment | Third embodiment | Fourth embodiment | Fifth embodiment | Sixth embodiment |
|---|---|---|---|---|---|---|
| BFL/TTL | 0.828 | 0.825 | 0.852 | 0.854 | 0.840 | 0.837 |
| f | 18.000 | 18.000 | 16.000 | 16.000 | 18.000 | 18.000 |
| TTL/f | 1.211 | 1.193 | 1.244 | 1.266 | 1.301 | 1.278 |
| Nmax | 1.668 | 1.668 | 1.668 | 1.668 | 1.668 | 1.668 |
| BFL/f | 1.002 | 0.984 | 1.060 | 1.082 | 1.092 | 1.070 |

TABLE 15

| Conditional expression | First embodiment | Second embodiment | Third embodiment | Fourth embodiment | Fifth embodiment | Sixth embodiment |
|---|---|---|---|---|---|---|
| ImgHT/BFL | 0.1164 | 0.1185 | 0.1238 | 0.1213 | 0.1221 | 0.1246 |
| fF/BFL | 0.6740 | 0.6432 | 1.2277 | 1.1391 | 0.6727 | 0.6896 |
| fR/BFL | −0.8180 | −0.5499 | −0.8292 | −0.8274 | −0.8660 | −0.8988 |
| |(fF + fR)/BFL| | 0.1441 | 0.0934 | 0.3985 | 0.3117 | 0.1933 | 0.2092 |
| LFS1/BFL | 0.3495 | 0.3452 | 0.4773 | 0.4777 | 0.3337 | 0.3390 |
| (LFS1 + LRS2)/BFL | 0.5348 | 0.5281 | 0.6264 | 0.6265 | 0.5450 | 0.5316 |
| fR/f | −0.8200 | −0.5411 | −0.8788 | −0.8951 | −0.9458 | −0.9617 |

An example electronic device, in accordance with one or more embodiments, will be described with reference to FIG. 20.

The example electronic device, in accordance with one or more embodiments, may include the example imaging lens system according to an aspect. In an example, the electronic device may include one or more of the example imaging lens systems according to a first embodiment to a sixth embodiment. As a specific example, the example electronic device may include the imaging lens system 100 according to a first embodiment.

Figure 20:
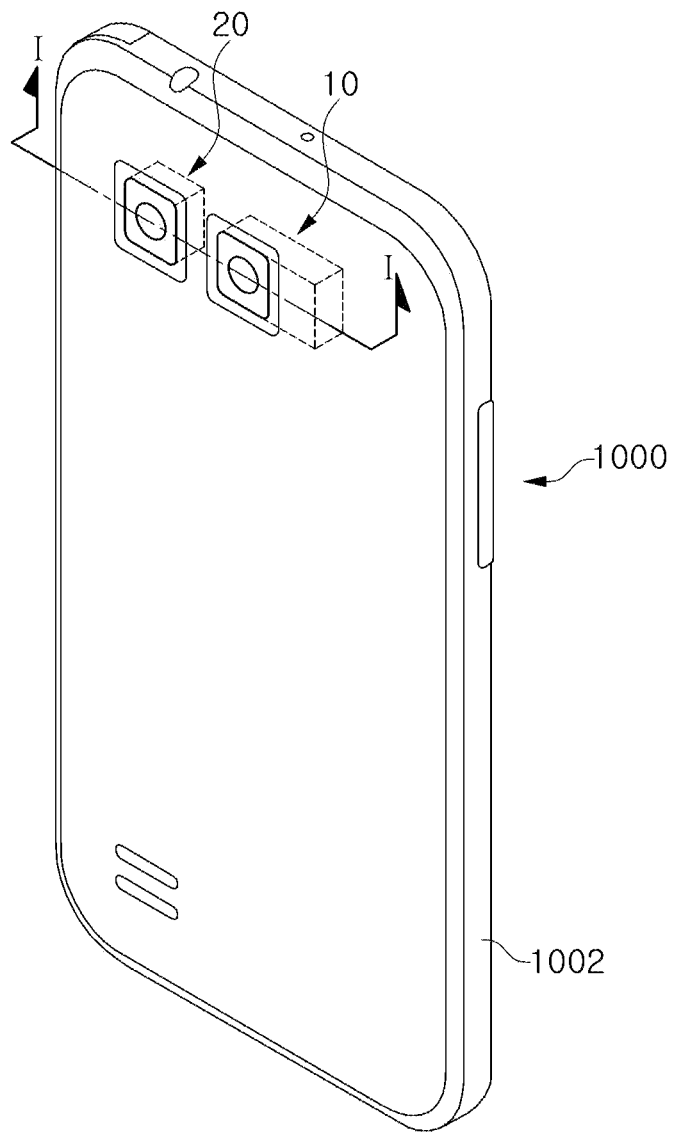
FIG. 20 illustrates a perspective view of an example electronic device, in accordance with one or more embodiments.

The example electronic device according to an embodiment may be, as an example, a portable terminal 1000 as illustrated in FIG. 20. However, a type of the electronic device is not limited to the portable terminal 1000. In an example, the electronic device according to another embodiment may be a laptop computer.

The portable terminal 1000 may include one or more camera modules 10 and 20. In an example, two camera modules 10 and 20 may be installed in a body 1002 of the portable terminal 1000 at a predetermined interval. The first camera module 10 and the second camera module 20 may capture an object in a same direction. In an example, the first camera module 10 and the second camera module 20 may be installed on one surface of the electronic device 1000.

At least one of the first camera module 10 and the second camera module 20 may include the example imaging lens system according to one of the first to fourth embodiments. In an example, the first camera module 10 may include the imaging lens system 100 according to a first embodiment.

The first camera module 10 may capture an image of an object disposed at a long distance. In other words, a focal length of the first camera module 10 may be greater than a focal length of the second camera module 20.

As set forth above, the one or more examples may provide an imaging lens system that reduces or blocks the flare phenomenon which may be caused by the optical path folding member.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An imaging lens system, comprising:
a lens group including a first lens, a second lens, a third lens, and a fourth lens sequentially disposed from an object side toward an imaging plane; and
an optical path folding member disposed between the lens group and the imaging plane,
wherein the first lens has a concave image-side surface;
wherein the second lens has positive refractive power,
wherein the third lens has positive refractive power, a convex object-side surface in a paraxial region and a concave image-side surface in a paraxial region,
wherein the fourth lens has a convex object-side surface in a paraxial region,
wherein a numerical value of a radius of curvature of an object-side surface of the third lens is less than a numerical value of a radius of curvature of an object-side surface of the fourth lens,
wherein $0.60 < fF/BFL < 1.30$, and
wherein $0.70 < BFL/f < 1.20$,
where fF is a focal length of a frontmost lens disposed closest to an object in the lens group, BFL is a distance from an image-side surface of a rearmost lens disposed closest to the imaging plane in the lens group to the imaging plane, and f is a focal length of the imaging lens system.

2. The imaging lens system of claim 1, wherein a portion of the optical path folding member, other than an incident light entrance area and an emitted light exit area of the optical path folding member, is covered by a light-shielding member.

3. The imaging lens system of claim 1, wherein the optical path folding member has a structure that adjusts an amount of received light.

4. The imaging lens system of claim 3, wherein the structure is at least one of a groove and an inclined surface.

5. The imaging lens system of claim 1, wherein the optical path folding member includes an inclined surface that is parallel to reflected light inside the optical path folding member.

6. The imaging lens system of claim 1, wherein the optical path folding member has two or more reflective surfaces.

7. The imaging lens system of claim 1, wherein the first lens has positive refractive power.

8. The imaging lens system of claim 1, wherein the rearmost lens has negative refractive power.

9. An electronic device comprising the imaging lens system of claim 1.

* * * * *